US012732771B2

(12) United States Patent
Walther et al.

(10) Patent No.: US 12,732,771 B2
(45) Date of Patent: Sep. 8, 2026

(54) APPARATUS AND METHOD FOR RENDERING AUDIO OBJECTS

(71) Applicant: Fraunhofer-Gesellschaft zur Foerderung der angewandten Forschung e.V., Munich (DE)

(72) Inventors: Andreas Walther, Erlangen (DE); Christof Faller, Greifensee (CH); Jürgen Herre, Erlangen (DE); Markus Schmidt, Lausanne (CH); Christian Borss, Erlangen (DE); Julian Klapp, Erlangen (DE); Philipp Götz, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 246 days.

(21) Appl. No.: 18/454,942

(22) Filed: Aug. 24, 2023

(65) Prior Publication Data

US 2023/0396950 A1 Dec. 7, 2023

Related U.S. Application Data

(63) Continuation of application No. PCT/EP2022/054880, filed on Feb. 25, 2022.

(30) Foreign Application Priority Data

Feb. 26, 2021 (WO) ................. PCT/EP2021/054853

(51) Int. Cl.
*H04S 7/00* (2006.01)

(52) U.S. Cl.
CPC .......... *H04S 7/307* (2013.01); *H04S 2400/11* (2013.01)

(58) Field of Classification Search
CPC ........ H04S 7/307; H04S 2400/11; H04R 3/12
See application file for complete search history.

(56) References Cited

U.S. PATENT DOCUMENTS 3,236,949 A 2/1966 Atal et al.
9,756,444 B2 9/2017 Tsingos
(Continued)

FOREIGN PATENT DOCUMENTS

CN 103650539 A 3/2014
CN 105103569 A 11/2015
(Continued)

OTHER PUBLICATIONS

B. B. Bauer, "Stereophonic earphones and binaural loudspeakers", J. Audio Eng. Soc., 9:148-151, 1961.
(Continued)

*Primary Examiner* — James K Mooney
(74) *Attorney, Agent, or Firm* — Ashurst Perkins Coie US LLP; Michael A. Glenn

(57) ABSTRACT

A more efficient rendering of audio objects, which allows 3D panning, is achieved by performing the panning into two stages, namely at least one horizontal in-layer panning leading to a first virtual (speaker) position and a second virtual or real (speaker) position, which is vertically offset, and another panning vertically between the two positions. Although acting in such a manner seems to increase the computational complexity, this staged processing increases, in fact, the stability of the rendering and the location of the intended virtual position. Moreover, the staged processing, enables to perform, according to an embodiment, the panning by use of amplitude panning gains only, i.e. phase processing is not necessary, thereby rendering the compu-
(Continued)

tational complexity low. Even further, the rendering is flexible with respect to applicability to a variety of loudspeaker setups.

34 Claims, 9 Drawing Sheets

(56) References Cited

U.S. PATENT DOCUMENTS

| | | | | |
|---|---|---|---|---|
| 9,913,064 | B2 | 3/2018 | Peters et al. | |
| 2010/0266133 | A1 | 10/2010 | Nakano | |
| 2012/0008789 | A1 | 1/2012 | Kim et al. | |
| 2012/0213375 | A1 | 8/2012 | Mahabub et al. | |
| 2014/0119581 | A1 | 5/2014 | Tsingos et al. | |
| 2014/0133683 | A1 | 5/2014 | Robinson et al. | |
| 2015/0350802 | A1 | 12/2015 | Jo et al. | |
| 2016/0044433 | A1 * | 2/2016 | Tsingos | H04S 3/002 381/307 |
| 2016/0073213 | A1 | 3/2016 | Yamamoto et al. | |
| 2016/0142853 | A1 | 5/2016 | Herre et al. | |
| 2016/0150346 | A1 | 5/2016 | Reuss | |
| 2017/0188170 | A1 | 6/2017 | Prins et al. | |
| 2017/0289724 | A1 | 10/2017 | Breebaart et al. | |
| 2018/0077515 | A1 | 3/2018 | Tsingos et al. | |
| 2019/0090078 | A1 | 3/2019 | Chon et al. | |
| 2020/0322743 | A1 | 10/2020 | Cengarie et al. | |
| 2020/0351606 | A1 | 11/2020 | Seefeldt | |
| 2020/0411020 | A1 | 12/2020 | Laitinen et al. | |

FOREIGN PATENT DOCUMENTS

| | | | |
|---|---|---|---|
| CN | 111869241 | A | 10/2020 |
| CN | 111937413 | A | 11/2020 |
| EP | 3024253 | A1 | 5/2016 |
| EP | 3780659 | A1 | 2/2021 |
| JP | 2008017117 | A | 1/2008 |
| JP | 2010258497 | A | 11/2010 |
| JP | 2014520491 | A | 8/2014 |
| JP | 2015080119 | A | 4/2015 |
| JP | 2016503635 | A | 2/2016 |
| JP | 2016518049 | A | 6/2016 |
| JP | 2016527805 | A | 9/2016 |
| RU | 2646337 | C1 | 3/2018 |
| RU | 2719283 | C1 | 4/2020 |
| TW | 201246060 | A | 11/2012 |
| TW | I611706 | B | 1/2018 |
| TW | 201933887 | A | 8/2019 |
| WO | 2014175075 | A1 | 10/2014 |
| WO | 2020201107 | A1 | 10/2020 |

OTHER PUBLICATIONS

Christian Borß, "A Polygon-Based Panning Method for 3D Loudspeaker Setups," Audio Engineering Society Convention 137, Oct. 2014 (10 pages).

Edgar Y Choueiri, "Optimal crosstalk cancellation for binaural audio with two loudspeakers", Princeton University, 2008 (24 pages).

Hironori Tokuno, Ole Kirkeby, Philip A Nelson, and Hareo Hamada. "Inverse filter of sound reproduction systems using regularization". IEICE Transactions on Fundamentals of Electronics, Communications and Computer Sciences, 80(5):809-820, 1997.

Hyunkook Lee, "Sound source and loudspeaker base angle dependency of phantom image elevation effect", J. Audio Eng. Soc, 65(9):733-748, 2017.

Hyunkook Lee, Dale Johnson, and Maksims Mironovs, "Virtual hemispherical amplitude panning (vhap): A method for 3d panning without elevated loudspeakers". In Audio Engineering Society Convention 144, May 2018 (9 pages).

J. Huopaniemi, "Virtual Acoustics and 3D Sound in Multimedia Signal Processing", PhD thesis, Laboratory of Acoustics and Audio Signal Processing, Helsinki University of Technology, Finland, 1999. Rep. 53 (189 pages).

MPEG-H Standard, ISO/IEC 23008-3:2015(E), paragraphs 24.3.2 and 24.3.4.6.4; tables 294 and 297 (20 pages).

Ole Kirkeby, Philip A. Nelson, Hareo Hamada, and Felipe Orduna-Bustamante, "Fast deconvolution of multichannel systems using regularization". IEEE Transactions on Speech and Audio Processing, 6(2):189-194, 1998.

P. A. Nelson and J. F. W. Rose, "Errors in two-point sound reproduction". The Journal of the Acoustical Society of America, 118(1):193, 2005 (12 pages).

Philip A Nelson, Hareo Hamada, and Stephen J Elliott, "Adaptive inverse filters for stereophonic sound reproduction". IEEE Transactions on Signal Processing, 40(7):1621-1632, 1992.

Reinhard Gretzki and Andreas Silzle, "A new method for elevation panning reducing the size of the resulting auditory events", TecniAcustica, Bilbao, 2003 (2 pages).

Takashi Takeuchi and Philip A. Nelson. "Optimal source distribution for binaural synthesis over loudspeakers". The Journal of the Acoustical Society of America, 112(6):2786, 2002 (12 pages).

Young Woo Lee et al., "Virtual Height Speaker Rendering for Samsung 10.2-channel Vertical Surround System". In Audio Engineering Society Convention 131, Oct. 2011 (10 pages).

Bukvic Ivica Ivo: "3D Time-Based Aural Data Representation Using D4 Library's Layer Based Amplitude Planning Algorithm", Proceedings of the 22nd International Conference on Auditory Display, ICAD 2016,Jul. 3, 2016 (Jul. 3, 2016), pp. 36-45, XP055862682; DOI : 10.21785/icad2016 .010; Retrieved from the Internet : URL:http :// www .icad.org/icad2016/proceedings2/papers/ICAD2016 paper 10.pdf, the whole document.

K. Lee et al, "Audio Engineering Society Convention Paper 9045 3D Audio Object Rendering into 5.1 Surround System", Audio Engineering Society Convention Paper 9045 Presented at the 136th Convention, Apr. 26, 2014, Berlin, Germany,XP055323916; retrieved from the internet: URL: http://www.aes.org/e-1ib/inst/download.cfm/17192.pdf?ID=I7192; retrieved on Nov. 29, 2016, pp. 1-7; Figs. 1-5.

* cited by examiner

APPARATUS AND METHOD FOR RENDERING AUDIO OBJECTS

CROSS-REFERENCE TO RELATED APPLICATIONS

This application is a continuation of copending International Application No. PCT/EP2022/054880, filed Feb. 25, 2022, which is incorporated herein by reference in its entirety, and additionally claims priority from International Application No. PCT/EP2021/054853, filed Feb. 26, 2021, which is also incorporated herein by reference in its entirety.

The invention relates to the technical field of audio reproduction. Specifically, reproduction of multichannel audio with reproduction of elevated or lowered height sounds is described herein.

BACKGROUND OF THE INVENTION

For sound reproduction, there are different kinds of systems which differ with regard to their complexity and reproduction quality. The reference for movie sound is the cinema. Cinemas provide multi-channel surround sound, with loudspeakers installed not only in the front of the listener (usually behind the screen), but additionally on the sides and rear, and recently also on the ceiling. The side and rear loudspeakers enable a horizontally enveloping sound reproduction, which can be further enhanced by vertically engulfing sound using height and ceiling loudspeakers.

With latest coding techniques, immersive, interactive, and object-based audio content can not only be used in professional environments, but can also conveniently be transmitted into the consumer's home, adding further features and dimensions, such as e.g. height reproduction.

Enhanced reproduction setups for realistic sound reproduction use loudspeakers not only mounted in the horizontal plane (usually at or close to ear-height of the listener), but additionally also loudspeakers spread in vertical direction. Those loudspeakers are e.g. elevated (mounted on the ceiling, or at some angle above head height) or are placed below the listener's ear height (e.g. on the floor, or on some intermediate or specific angle).

Often it is inconvenient or impossible to install loudspeakers at top or bottom directions.

In a home environment, likely only enthusiasts will install the number of loudspeakers needed to replicate the loudspeaker setups that are used in professional environments, research labs, or cinemas. Here, the term loudspeaker setup does also include devices and topologies like soundbars, TVs with built in loudspeakers, boomboxes, sound plates, loudspeaker arrays, smart speakers, and so forth.

Nonetheless, when rendering sound for an immersive sound experience or virtual reality, it is often desirable to render sound also in height (top and bottom) directions (denoted "top and bottom directions" in the following. Of course, not both directions have to be processed each time, so this is equivalent to "(either) top or bottom directions" or "top/bottom directions").

Therefore, the need arises to render sound in top and bottom directions without having height loudspeakers, e.g. top loudspeakers and/or bottom loudspeakers.

A convenient alternative to those rather complex setups is compact reproduction systems that use signal processing means to generate a comparable or similar spatial auditory perception as the enhanced loudspeaker setups. Here, the term reproduction systems include all devices and topologies for audio reproduction like setups comprising a number of individual loudspeakers, soundbars, TVs with built in loudspeakers, boomboxes, sound plates, loudspeaker arrays, smart speakers, and so forth.

A practical method and an apparatus to achieve this is presented in the following.

SUMMARY

According to an embodiment, an apparatus for generating loudspeaker signals for a plurality of loudspeakers so that an application of the loudspeaker signals at the plurality of loudspeakers renders at least one audio object at an intended virtual position, may have: an interface configured to receive an audio input signal which represents the at least one audio object, a first panning gain determiner, configured to determine, depending on the intended virtual position, first panning gains for a first set of loudspeakers of the plurality of loudspeakers, which are arranged within a first horizontal layer, the first panning gains defining a derivation of first partial loudspeaker signals from the at least one audio input signal, which are associated with a rendering of the at least one audio object at a first virtual position upon application of the first partial loudspeaker signals onto the first set of loudspeakers, a vertical panning gain determiner, configured to determine, depending on the intended virtual position, further panning gains for a panning between the first partial loudspeaker signals and one or more second partial loudspeaker signals which is to be applied to a second set of one or more loudspeakers, which is arranged within a second horizontal layer, which is vertically offset relative to the first layer set, and is associated with a rendering of the at least one audio object at a second position so as to pan between the first virtual position and the second position, wherein the apparatus is configured to compose the loudspeaker signals from the audio input signal using the first panning gains and the further panning gains, wherein the apparatus is adaptive to different setups of the plurality of loudspeakers and configured to associate the plurality of loudspeakers to a plurality of horizontal layers so that one of the loudspeakers may be associated with different ones of the horizontal layers, and to select the first horizontal layer and the second horizontal layer out of the plurality of horizontal layers so that the intended virtual position is between the first horizontal layer and the second horizontal layer.

According to another embodiment, an apparatus for generating loudspeaker signals for a plurality of loudspeakers so that an application of the loudspeaker signals at the plurality of loudspeakers renders at least one audio object at an intended virtual position, wherein the plurality of loudspeakers are distributed onto one or more horizontal layers, may have: an interface configured to receive an audio input signal which represents the at least one audio object, a first loudspeaker signal set determiner, configured to determine, depending on the intended virtual position, first panning gains for a first set of loudspeakers of the plurality of loudspeakers, and use the first panning gains to derive first partial loudspeaker signals from the at least one audio input signal, which are associated with a rendering of the at least one audio object at a first virtual position upon application of the first partial loudspeaker signals onto the first set of loudspeakers, a second loudspeaker signal set determiner, configured to, by spectral shaping and by panning gains, derive second partial loudspeaker signals from the at least one audio input signal, the second partial loudspeaker signals being associated with a rendering of the at least one audio object at a second virtual position upon application of the second partial loudspeaker signals onto a second set of loudspeakers) of the plurality of loudspeakers, wherein the panning gains are selected so that the second virtual position is above or below the one or more horizontal layers and corresponds to a horizontal position which coincides with a listener position along a vertical projection, and a vertical panning gain determiner configured to, depending on the intended virtual position, determine further panning gains for the first and second partial loudspeaker signals so as to pan between the first and second virtual positions, and a composer configured to compose the loudspeaker signals from the first and second partial loudspeaker signals using the further panning gains.

According to another embodiment, a system may have: a plurality of loudspeakers and any of the inventive apparatuses.

According to another embodiment, a method for generating loudspeaker signals for a plurality of loudspeakers so that an application of the loudspeaker signals at the plurality of loudspeakers renders at least one audio object at an intended virtual position may have the steps of: receiving an audio input signal which represents the at least one audio object, determining, depending on the intended virtual position, first panning gains for a first set of loudspeakers of the plurality of loudspeakers, which are arranged within a first layer set of one or more first horizontal layers, the first panning gains defining a derivation of first partial loudspeaker signals from the at least one audio input signal, which are associated with a rendering of the at least one audio object at a first virtual position upon application of the first partial loudspeaker signals onto the first set of loudspeakers, determining, depending on the intended virtual position, further panning gains for a panning between the first partial loudspeaker signals and one or more second partial loudspeaker signals which is to be applied to a second set of one or more loudspeakers, which is vertically offset relative to the first layer set, and is associated with a rendering of the at least one audio object at a second position so as to pan between the first virtual position and the second position, composing the loudspeaker signals from the audio input signal using the first panning gains and the further panning gains.

According to another embodiment, a method for generating loudspeaker signals for a plurality of loudspeakers so that an application of the loudspeaker signals at the plurality of loudspeakers renders at least one audio object at an intended virtual position, wherein the plurality of loudspeakers are distributed onto one or more horizontal layers, may have the steps of: receiving an audio input signal which represents the at least one audio object, determining, depending on the intended virtual position, first panning gains for a first set of loudspeakers of the plurality of loudspeakers, and use the first panning gains to derive first partial loudspeaker signals from the at least one audio input signal, which are associated with a rendering of the at least one audio object at a first virtual position upon application of the first partial loudspeaker signals onto the first set of loudspeakers, by spectral shaping, deriving second partial loudspeaker signals from the at least one audio input signal, the second partial loudspeaker signals being associated with a rendering of the at least one audio object at a second virtual position upon application of the second partial loudspeaker signals onto a second set of loudspeakers, the second virtual position being above or below the one or more horizontal layers, and depending on the intended virtual position, determining further panning gains for the first and second partial loudspeaker signals so as to pan between the first and second virtual positions, and composing the loudspeaker signals from the first and second partial loudspeaker signals using the further panning gains.

Another embodiment may have a non-transitory digital storage medium having a computer program stored thereon to perform any of the inventive methods when said computer program is run by a computer.

A more efficient rendering of audio objects, which allows 3D panning, is achieved by performing the panning in two stages, namely at least one horizontal in-layer panning leading to a first virtual (speaker) position and a second virtual or real (speaker) position, which is vertically offset, and another panning vertically between the two positions. Although acting in such a manner seems to increase the computational complexity, this staged processing increases, in fact, the stability of the rendering and the precision of localization of the intended virtual position. Moreover, the staged processing enables to perform, according to an embodiment, the panning by use of amplitude panning gains only, i.e. phase processing is not necessary, thereby rendering the computational complexity low. Even further, the rendering is flexible with respect to applicability to a variety of loudspeaker setups.

Embodiments of the present application refer to an apparatus for generating loudspeaker signals for a plurality of loudspeakers so that an application of the loudspeaker signals at the plurality of loudspeakers renders at least one audio object at an intended virtual position. The apparatus comprises an interface configured to receive an audio input signal which represents the at least one audio object. It may be one of a channel-based audio signal, object-based audio signal, and/or scene-based audio signal. A first panning gain determiner is configured to determine, depending on the intended virtual position, first panning gains for a first set of loudspeakers of the plurality of loudspeakers, which are arranged within a first layer set of one or more first horizontal layers, the first panning gains defining a derivation of first partial loudspeaker signals from the at least one audio input signal, which are associated with a rendering of the at least one audio object at a first virtual position upon application of the first partial loudspeaker signals onto the first set of loudspeakers. This is the afore-mentioned in-layer panning. A vertical panning gain determiner is configured to determine, depending on the intended virtual position, further panning gains for a panning (or fading) between the first partial loudspeaker signals and one or more second partial loudspeaker signals which is to be applied to a second set of one or more loudspeakers and is associated with a rendering of the at least one audio object at a second position, which is vertically offset relative to the first position, so as to pan between the first virtual position and the second position. This is the vertical panning. The one or more second partial loudspeaker signals may be the result of another in-layer panning in which case the second position is a second virtual position or the second position may be the real position of another one of the loudspeakers, which is positioned vertically offset to the first set of loudspeakers. The apparatus is configured to compose the loudspeaker signals from the first partial loudspeaker signals and the one or more second partial loudspeaker signals using the first panning gains and the further panning gains. That is, in the composition, the first and further panning gains are actually applied onto the audio input signal, thereby leading to the loudspeaker signals. There may possibly be one or more loudspeaker signals, for the generation of which just one of the panning gains is to be used, such as for the just-mentioned second loudspeaker positioned at the real loudspeaker position and fed with the second partial loudspeaker signal.

According to some embodiments, as said, the second set of one or more loudspeakers comprises more than one loudspeaker, and the one or more second partial loudspeaker signals comprise more than one second partial loudspeaker signals and the apparatus further comprises a second panning gain determiner, configured to determine, depending on the intended virtual position, second panning gains for the second set of loudspeakers, the second panning gains defining a derivation of second partial loudspeaker signals from the at least one audio input signal, wherein the apparatus is configured to compose the loudspeaker signals from the first and second partial loudspeaker signals using the first and second panning gains and the further panning gains. Here, according to an embodiment, the second partial loudspeaker signals may be derived from the at least one audio signal by spectral shaping, so that the second position is a virtual position above or below the second layer set, such as not between or within any of the one or more first horizontal layers, and the one or more second horizontal layers, within which the second set of loudspeakers are arranged, but on one side, vertically, relative to these horizontal layers. In accordance with corresponding embodiments, an apparatus results which is for generating loudspeaker signals for a plurality of loudspeakers so that an application of the loudspeaker signals at the plurality of loudspeakers renders at least one audio object at an intended virtual position, wherein the plurality of loudspeakers are distributed onto one or more horizontal layers, the apparatus comprising an interface configured to receive an audio input signal which represents the at least one audio object, a first loudspeaker signal set determiner, configured to determine, depending on the intended virtual position, first panning gains, e.g., as said pure amplitude panning gains so that the first virtual position is in-between positions of the first set of loudspeakers, for a first set of loudspeakers of the plurality of loudspeakers, and use the first panning gains to derive first partial loudspeaker signals from the at least one audio input signal, which are associated with a rendering of the at least one audio object at a first virtual position upon application of the first partial loudspeaker signals onto the first set of loudspeakers, a second loudspeaker signal set determiner, configured to, by spectral shaping, derive second partial loudspeaker signals from the at least one audio signal, the second partial loudspeaker signals being associated with a rendering of the at least one audio object at a second virtual position upon application of the second partial loudspeaker signals onto the second set of loudspeakers, the second virtual position being above or below the one or more horizontal layers, e.g. not between or within any of the one or more horizontal layers, but on one side, vertically, relative to the one or more horizontal layers, and a vertical panning gain determiner configured to, depending on the intended virtual position, determine second panning gains for the first and second partial loudspeaker signals so as to pan between the first and second virtual positions, and a composer configured to compose the loudspeaker signals from the first and second partial loudspeaker signals using the second panning gains.

Embodiments set-out herein reveal, thus, a concept for rendering at least one audio object to a set of loudspeakers from at least one audio input signal. In brief, audio input signals may comprise information about audio objects that are to be output by the loudspeakers. For example, such an audio object can be a sound of a helicopter flying in a movie, sound of an instrument playing in an orchestra, or sound of a voice. The audio object is rendered using loudspeakers. The audio input signal is processed to determine how the audio object is to be output at individual loudspeakers. For this each audio input signal is associated with position information of the at least one audio object. Such position information can be static, e.g. the violin is located on the left of the orchestra, the speaker is in front of the listener, or dynamic, e.g. the helicopter flies from right to left. The set of loudspeakers used to render the audio object may comprise one or more groups of loudspeakers, each group located in one horizontal layer. An additional loudspeaker may be a physical or virtual loudspeaker, located above or below the one or more groups.

That means that for the set of loudspeakers an association with layers and positions offset to the layers above or below the layers may be defined. For example, the setup can comprise four loudspeakers in one layer, e.g. all at the same height, and one physical or virtual loudspeaker higher, e.g. elevated, above the four other loudspeakers. This setup would then have one layer. Additional one or more layers are also possible.

BRIEF DESCRIPTION OF THE DRAWINGS

Embodiments of the present invention will be detailed subsequently referring to the appended drawings, in which.

DETAILED DESCRIPTION OF THE INVENTION

The following description starts with a description of an embodiment of an apparatus for generating loudspeaker signals for a plurality of loudspeakers. More specific embodiments are outlined herein below along with a description of details which may, individually or in groups, apply to the apparatus of FIG. 1.

Figure 1:
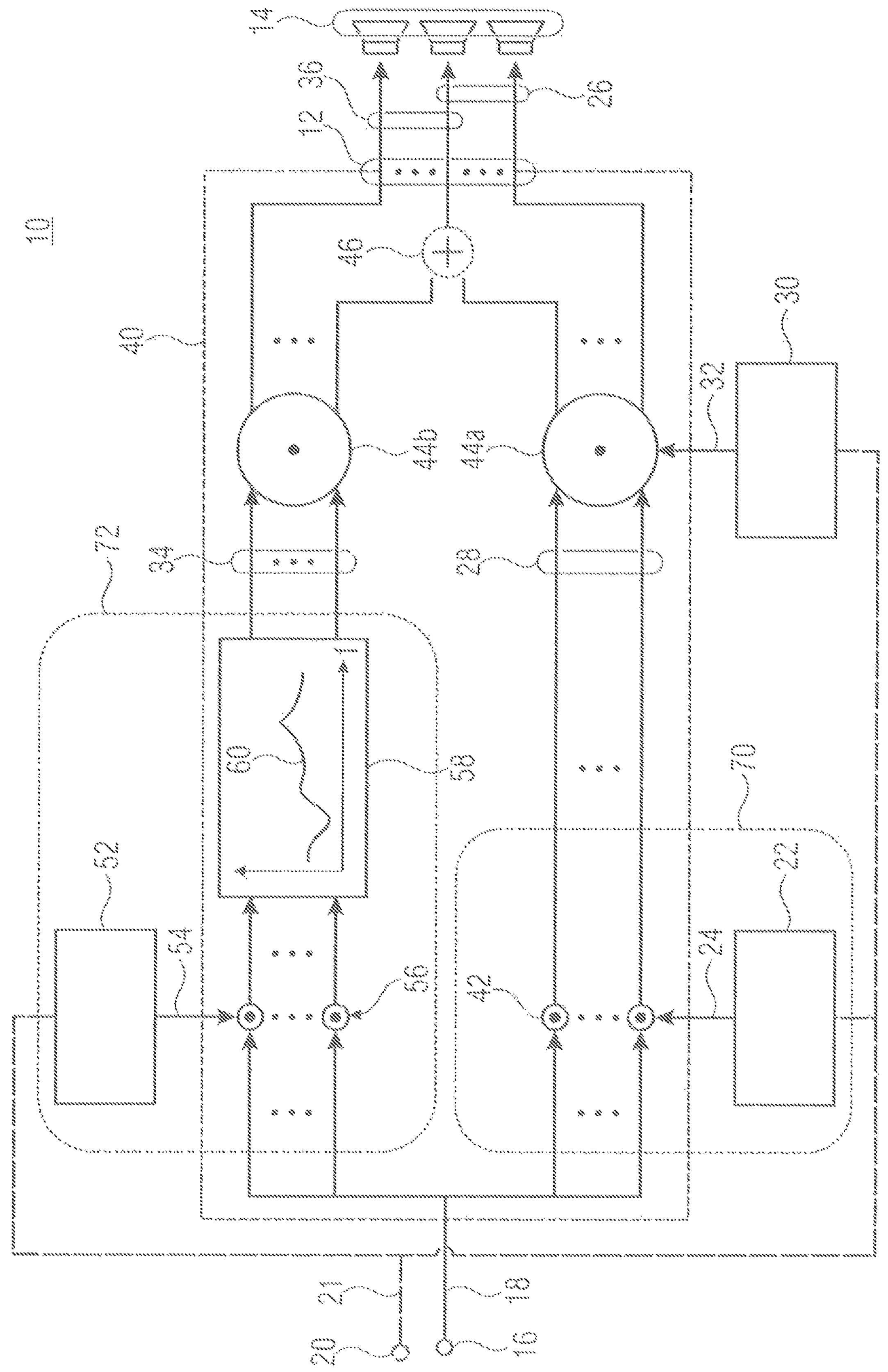
FIG. 1 shows a block diagram of an apparatus for audio rendering in accordance with an embodiment.

The apparatus of FIG. 1 is generally indicated using reference sign 10 and is for generating loudspeaker signals 12 for a plurality of loudspeakers 14 in a manner so that an application of the loudspeaker signals 12 at or to the plurality of loudspeakers 14 renders at least one audio object at an intended virtual position.

The apparatus 10 might be configured for a certain arrangement of loudspeakers 14, i.e., for certain positions in which the plurality of loudspeakers 14 are positioned or positioned and oriented. The apparatus may, however, alternatively be able to be configurable for different loudspeaker arrangements of loudspeakers 14. Likewise, the number of loudspeakers 14 may be two or more and the apparatus may be designed for a set number of loudspeakers 14 or may be configurable to deal with any number of loudspeakers 14.

The apparatus 10 comprises an interface 16 at which apparatus 10 receives an audio signal 18 which represents the at least one audio object. For the time being, let's assume that the audio input signal 18 is a mono audio signal which represents the audio object such as the sound of a helicopter or the like. Additional examples and further details are provided below.

In any case, the audio signal 18 may represent the audio object in time domain, in frequency domain or in any other domain and it may represent the audio object in a compressed manner or without compression.

As depicted in FIG. 1, the apparatus 10 further comprises a position input for receiving the intended virtual position. That is, at position input 20, the apparatus 10 is notified about the intended virtual position to which the audio object shall virtually be rendered by the application of the loudspeaker signals 12 at loudspeakers 14. That is, the apparatus 10 receives at input 20 the information of the intended virtual position, and this information may be provided relative to the arrangement/position of loudspeakers 14, relative to the position and/or head orientation of the listener and/or relative to real-world coordinates. This information could e.g. be based on Cartesian coordinate systems, or polar coordinate systems. It could e.g. be based on a room centric coordinate system or a listener centric coordinate system, either as a cartesian, or polar coordinate system.

As depicted in FIG. 1, apparatus 10 comprises a first panning gain determiner 22 configured to determine, depending on the intended virtual position 21 received at input 20, first panning gains 24 for a first set 26 of loudspeakers out of the plurality of loudspeakers 14. This set 26 of loudspeakers is arranged within a first layer set of one or more first horizontal layers. That is, this set 26 of loudspeakers, quasi, are arranged at similar heights. The first panning gains 24 define a derivation of, or participate in a generation of, first partial loudspeaker signals 28 from the at least one audio input signal 18, which first partial loudspeaker signals 28 are associated with a rendering of the at least one audio object at a first virtual position upon an application of the first partial loudspeaker signals onto the first set 26 of loudspeakers. As outlined in more detail below, the first panning gain determiner 22 may, according to an embodiment, compute amplitude gains, one for each partial loudspeaker signal of the first partial loudspeaker signals 28, so that the first virtual position is panned between the loudspeakers of set 26—including the possible case that, occasionally, the first virtual position coincides with one of the loudspeaker positions in which case merely the loudspeaker at that position might receive a non-zero panning gain. In even other words, the first panning gain determiner 22 is for computing amplitude gains for a horizontal panning within set 26, so that this horizontal panning results into a virtual rendering position within the first layer set of the set 26 of loudspeakers.

Apparatus 10 of FIG. 1 further comprises a vertical panning gain determiner 30 which is configured to determine, depending on the intended virtual position 21, further panning gains for a panning between the first partial loudspeaker signals 28 on the one hand and one or more second partial loudspeaker signals 34 on the other hand. The one or more second partial loudspeaker signals 34 are to be applied to a second set 36 of one or more loudspeakers out of loudspeakers 14, which comprises merely one loudspeaker or more than one.

FIG. 1 illustrates the case where the number of second partial loudspeaker signals 34 and loudspeakers within set 36 is more than one, but it may also be true that there is merely one loudspeaker within set 36 and, accordingly, merely one second partial loudspeaker signal 34. In the latter case, the single loudspeaker of set 36 would be external to set 26 of loudspeakers for which the first partial loudspeaker signals 28 are dedicated. In case of set 36 comprising more than one loudspeaker, sets 26 and 36 may be mutually disjoint, partially overlap, coincide or completely overlap, i.e., one may be a proper subset of the other. Examples are set out in more detail below. In any case, the second position is vertically offset relative to the first position. Different examples of how to achieve the vertical offset between first and second positions even in case of the first and second sets 26 and 36 coinciding, are set out herein below. Note that in the embodiments outlined with respect to the figures, each set 26 and 36 is made out of loudspeakers of one layer or even corresponds to one layer, so that in case of coincidence of sets 26 and 36, the layers sets, i.e. the layers of sets 26 and 32, coincide as well. However, this correspondence between sets and layers may be varied so that any of sets 26 and 32 may be composed of loudspeakers of more than one layer.

The further panning gains 32 determined by vertical panning gain determiner 30 finally result into a panning between the first virtual position and the second position.

As shown in FIG. 1, apparatus 10 further comprises a composer 40 which is further configured to compose the loudspeaker signals 12 from the input audio signal 18 using the first panning gains 24 and the further panning gains 32. As said, the first panning gains may be simple amplitude gains and accordingly, composer 40 may comprise a multiplier 42 for each partial loudspeaker signal 28 for a multiplication of the input audio signal 18 with the corresponding panning gain 24. The panning gains 24 are, accordingly, individual for partial loudspeaker signals 28. That is, there is one panning gain 24 per partial input signal 28. Similarly, and as further outlined below, the panning gains 32 output by vertical panning gain determiner 30 may be simple amplitude gains, too. Here, there is one panning gain 32 per set 28 and 34, respectively. Accordingly, composer 40 may comprise one multiplier 44*a*, 44*b* for each of sets 28 and 34, respectively, with multiplier 44*a* multiplying each loudspeaker signal of set 28 with the panning gain 32 associated with that set 28, and multiplier 44*b* multiplying each partial loudspeaker signal out of set 34 with the panning gain 32 associated with that set 34.

A further task of composer 40 is the following: as mentioned above, loudspeaker sets 26 and 36 may or may not overlap. As a task of composer 40, composer 40 correctly distributes the partial loudspeaker signals 28 and 34, obtained by panning using panning gains 24 and 32, onto loudspeakers 14. For those partial loudspeaker signals of sets 28 and 34, which merely belong to one of sets 28 and 34, the corresponding partial loudspeaker signal becomes one of the loudspeaker signals 12. For those one or more partial loudspeaker signals, however, which are associated with the same loudspeaker out of loudspeakers 14, however, composer 40 adds them up using an adder 46 so that the sum of mutually corresponding partial loudspeaker signals out of set 28 and 34, respectively, become one of the loudspeaker signals 12.

It should be noted that, owing to the associative and commutative properties of the multiplication, composer 40 is not restricted to perform the multiplications for each partial loudspeaker signal in the order depicted in FIG. 1. That is, although composer 40 of FIG. 1 is depicted to perform the partial loudspeaker signal individual multiplication with the first panning gains 24 prior to the multiplication with the set-global panning gain 32, the multiplications may be performed in a different order.

FIG. 1 also illustrates details which are used according to embodiments further described hereinbelow. In particular, these details relate to the derivation or generation of partial loudspeaker signals 34 from input audio signal 18. Two further processing steps may be associated with a derivation/generation of partial loudspeaker signals 34 from audio input signal 18. These two processing steps and the corresponding elements in FIG. 1, are optional and, accordingly, the input audio signal may represent one partial loudspeaker signal 34 directly, which is subject to the vertical panning by means of the corresponding panning gain 32. If present, merely one or both processing steps may apply and be embodied within apparatus 10.

The first processing step corresponds to a horizontal panning with respect to the partial loudspeaker signals 34 in a manner substantially corresponding to the horizontal panning realized by elements 22, 24 and 42 with respect to partial loudspeaker signals 28. That is, as shown in FIG. 1, apparatus 10 may comprise a second panning gain determiner 52 configured to determine, depending on the intended virtual position 21, second panning gains 54 for the second set 36 of loudspeakers, the second panning gains 54 defining the derivation of the second partial loudspeaker signals 34 from the at least one audio input signal 18. Composer 40 would comprise corresponding multipliers 56, namely one per partial loudspeaker signal 34, which multiplies the corresponding panning gain 54 with the audio input signal. In other words, composer 40 would subject the partial loudspeaker signal 34 for each loudspeaker within set 36 to a multiplication with the panning gain 54 associated with the corresponding loudspeaker within set 36. This would result into a horizontal panning and to a virtual loudspeaker position associated with the partial loudspeaker signals 34.

Additionally or alternatively relative to elements 52-56, apparatus 10 may comprise a spectral shaper 58 which performs spectral shaping to the input audio signal or intermediary or final products as a result of the horizontal panning at multipliers 56 and vertical panning at multiplier 44*b*, so that the second partial loudspeaker signals 34 are derived from the at least one audio input signal by this spectral shaping. The spectral shaping is, for instance, for each of the partial loudspeaker signals 34 equal, i.e., the same spectral shaping function may be used. As outlined in more detail below, the spectral shaping function 60 used by spectral shaper 58, is selected so as to form a psychoacoustical cue for the listener that the second virtual position associated with the second partial loudspeaker signals 34 is positioned above or below the second set 36 of loudspeakers.

The spectral shaping performed by spectral shaper 58 may be performed in spectral domain by means of a multiplication of the partial loudspeaker signals' spectrum with the shaping function 60, or may be done in time domain such as by means of a time domain filter such as an IIR or FIR filter, which time domain filter then would have the frequency response corresponding to spectral shaping function 60. Further notes will be made with respect to the sets 26 and 36. The apparatus may select same depending on a current speaker setup. In other words, the apparatus may be adaptive to different setups. The apparatus may select the first set 26 of loudspeakers out of the plurality of loudspeakers depending on a horizontal component of the intended virtual position such as out of one layer those speakers nearest to the intended virtual position (as far as its vertical projection into the one layer is concerned) or depending on the horizontal component of the intended virtual position and a vertical component of the intended virtual position such as by selecting an outmost layer nearest to the intended virtual position and then selecting the speakers within that one layer. Additionally or alternatively, the second set 36 of loudspeakers may be selected out of the plurality of loudspeakers depending on a vertical component of the intended virtual position such as by selecting an outmost layer nearest to the intended virtual position and using all the speakers belonging to that layer for set 36, or depending on the horizontal component of the intended virtual position and the vertical component of the intended virtual position such as by selecting an outmost layer nearest to the intended virtual position and selecting the set 36 out of the speakers of the layer so that same are nearest to the intended virtual position (as far as its vertical projection into the one layer is concerned).

As mentioned before with respect to the first partial loudspeaker signals 28, composer 40 may be configured to perform the multiplication 56 and 44*b* as well as the spectral shaping 58 in any order, i.e., may apply the three tasks in any order onto the audio input signal 18 in order to result into the corresponding partial loudspeaker signals 34.

Lastly, it should be noted that according to an example, it may be that the number of loudspeakers within set 36 and, thus, a number of partial loudspeaker signals 34, respectively, may be one, even in case of using the spectral shaper 58.

Before proceeding with the description of certain details and embodiments of the present application, which are described in the following by reusing the reference signs and the description brought forward above, the following note shall be made with respect to the composer 40: in case of FIG. 1, panning gain determiners 22, 30 and 52 form kind of intermediary modules for computing the panning gains on the basis of the intended virtual position 21 while the actual application of the panning gains had been performed by composer 40. Additionally, spectral shaper 58 was shown to be included within composer 40 as a submodule thereof.

However, as said above, modifications compared to the illustration of FIG. 1 are feasible. For instance, the spectral shaper 58 could be placed upstream elements 52, 54 and 56 so as to become, finally, a module external to, and especially upstream to, composer 40. Composer 40 would then, as far as the first loudspeaker set 36 is concerned, perform the composition of the loudspeaker signals 12 on the basis of a pre-shaped version of the audio input signal 18. Additionally or alternatively, most of the subsequently explained embodiments make use of a composition, where the vertical panning is applied after the horizontal panning which, in turn, is realized by means of multipliers 42 and/or 56 and, if applicable, the spectral shaping 58, and in that case, composer 40 and its composition may involve elements 44*a*, 44*b* and, if applicable, adder 46, only, whereas elements 22, 24 and 42 form a first loudspeaker signal set determiner 70 and elements 52, 54, 56, 58 and 60 (or parts thereof if the horizontal panning or the spectral shaping is missing) form a second loudspeaker signal determiner 72.

Before resuming the description with the announced further details and further detailed embodiments, a brief note shall be made with respect the achieved advantages resulting from the concept of audio rendering as depicted in FIG. 1. In particular, as outlined above, the audio rendering of the concept of FIG. 1 allows the audio reproduction to get along without the usage and the associated computationally complex tasks of applying different HRTFs that are precisely adapted or selected based on or according to an exact angular variation of the intended virtual position 21. All horizontal and vertical panning is done by amplitude panning only, and the spectral shaping 58 may use one spectral shaping or an equal spectral shaping function 60 for all partial loudspeaker signals 34 for all loudspeakers within set 36. In the embodiments described further below, apparatus 10 may either use continuously the same spectral shaping function 60 irrespective of the intended virtual position 21 (such as in case of the intended virtual position 21 being restricted to positions which are, in height, within, between, or above, the listener position or the layers of the loudspeakers 14, or vice versa, in case of being restricted to positions which are, in height, within, between, or below, the listener position or the layers of the loudspeakers 14) or to discriminate between two spectral shaping functions 60, one being used in case of the intended virtual position 21 being higher than the listener's position or the highest loudspeaker layer, respectively, and the other in case of being lower than the listener's position or the lowest loudspeaker layer, respectively. Thus, the computational complexity of the rendering of FIG. 1 is low. This is also true when making use of the optional spectral shaping 58.

Moreover, although the decomposition of the 3D panning into horizontal panning on the one hand and vertical panning on the other hand might appear to result in a more complex rendering procedure, the resulting computational complexity is still low, while the rendering accuracy in terms of positioning the intended virtual position is still high even at this computational moderate complexity.

That is, embodiments described herein provide an alternative to the rather complex setups set-out in the introductory portion of the specification and form a compact reproduction that uses signal processing means to generate a comparable or similar spatial auditory perception as more complex loudspeaker setups. The concepts presented above and in the following are capable of (1) perceptually replacing missing loudspeakers/loudspeaker arrays by consideration of one or more virtual loudspeakers. The generation of those virtual loudspeakers is described herein.

(2) efficiently rendering sound in 3D loudspeaker setups, wherein the rendering can be used if the virtual loudspeaker (1) is used, as well as in scenarios where the needed loudspeakers are available physically. The benefit of (2) is the flexibility and efficiency, which makes it also applicable in scenarios where the listener position is tracked in real time, and the rendering is adapted in real time to the listener's current position.

Note that the embodiments described herein are independent of the reproduction environment and could, e.g., also be used e.g. in an automotive environment. Furthermore, the embodiments are independent of the specific type of transducer or topology used for reproduction. That is, the embodiments could be applied e.g. in headphone reproduction, as well as in reproduction using specific loudspeakers such as loudspeaker arrays, soundbars, smart speakers, etc.

That is, the just-made notes render clear that the loudspeakers 14 may be headphone loudspeakers or stereo loudspeakers, but may, as well, form a loudspeaker array, a soundbar, or a set of loudspeakers, smart speakers, or a set of smart speakers, from a surround sound setup or may be individual loudspeakers, wherein combinations may be feasible as well. Moreover, the description made clear that apparatus 10 operates adaptive in order to adapt, in real-time, the composition of the loudspeaker signals 12 to the intended virtual position 21 which may vary in time.

In this regard, it shall briefly be noted that, while embodiments of the rendering apparatuses may be pre-configured for certain loudspeaker setups, i.e. that they expect a predefined set of loudspeakers 14 to be positioned at predefined positions, it might also be that the apparatuses described herein are adaptive to different loudspeaker setups, differing in number of loudspeakers and/or speaker positions, in terms of an initialization of the apparatus and/or in terms of an adaptation to moving loudspeaker positions. In the former case, the apparatus may, after initialization, assume the loudspeaker setup to be constant. The latter case, the apparatus may even adapt to speaker setup variations during runtime. Even the number of speakers could vary in runtime. Accordingly, the apparatus may receive information on the loudspeaker positions with this optional circumstance, however, not being explicitly shown in the figures. Thus, similar to the optional reception of the listener position information, apparatus of FIG. 1 (and subsequently shown embodiments) may comprise a further position input for receiving the loudspeaker setup information revealing number of speakers 14 and positions thereof. This information may be provided relative to the position and/or head orientation of the listener and/or relative to real-world coordinates. This information could e.g. be based on Cartesian coordinate systems, or polar coordinate systems. It could e.g. be based on a room centric coordinate system or a listener centric coordinate system, either as a Cartesian, or polar coordinate system.

Commonly used methods for rendering are amplitude panning techniques. To generate the perception of an auditory object at positions that are not covered by loudspeakers (e.g. not between two or more loudspeakers), rendering techniques such as crosstalk cancelation can be utilized. Crosstalk cancellation (XTC) [1-7] has the goal to control the left and right ear signals of a listener by means of loudspeakers. This is achieved by "cancelling the crosstalk between the ears" which occurs when a loudspeaker's signal reaches a listener. Once the ear signals can directly be controlled, binaural techniques [8, 9] can be applied to render sound at top and bottom directions. There are two major limitations of the before mentioned technique. Firstly, XTC has limitations related to sound coloration, extremely small sweet spot, and high dependence on loudspeaker positions relative to the listener. Secondly, without head tracking/listener tracking and/or individualized head related transfer functions (HRTFs) or binaural room impulse responses (BRIRs), binaural techniques are limited in the achievable quality/performance. Both of these would add high complexity, cost, and user inconvenience to the system.

Enhancements to conventional amplitude panning have been proposed, using virtual loudspeakers in dimensions not covered by the loudspeaker setup, see e.g. [14, 15]. Height panning using such techniques is not entirely realistic as timbre deviates from sources truly rendered at height.

Vertical Hemispherical Amplitude Panning (VHAP) [10, 11] uses two lateral loudspeakers to render objects with height and on top of a listener. As the loudspeakers have to be at ±90 degrees lateral directions, VHAP is inflexible in terms of listener position.

In this specification, the term virtual loudspeaker is used for a non-existent loudspeaker which is considered during the process of panning an object.

The concept of FIG. 1 makes use of concepts for top and/or bottom rendering with the following advantages over the state-of-the-art techniques just mentioned:

- Equalization (spectral shaping 58) is applied to the top/bottom virtual loudspeaker signals for a more faithful top/bottom/height perception
- Any loudspeaker setup can be used for speakers 14, and nevertheless an enhancement for (virtual) top and bottom rendering is achievable. For example, a stereo setup or a 5.1 setup may be used as a basis for speakers 14. Even loudspeaker setups with height loudspeakers, e.g. 5.1+4H, can be enhanced using the concept of FIG. 1, such as with respect to Top rendering (e.g. "voice of god" loudspeaker), or lower layer rendering. In contrast to this, VHAP needs, for instance, a precise and specific loudspeaker setup with loudspeakers at each side of a listener (±90 degrees).
- Moreover, the top and bottom rendering of FIG. 1 does not rely on specific loudspeaker positions relative to the listener. In other words, the scheme of FIG. 1 can be applied also in a scenario where a listener moves, e.g. tracked rendering.

The embodiments described herein allow for very straight forward implementations of virtual height rendering.

Figure 2:
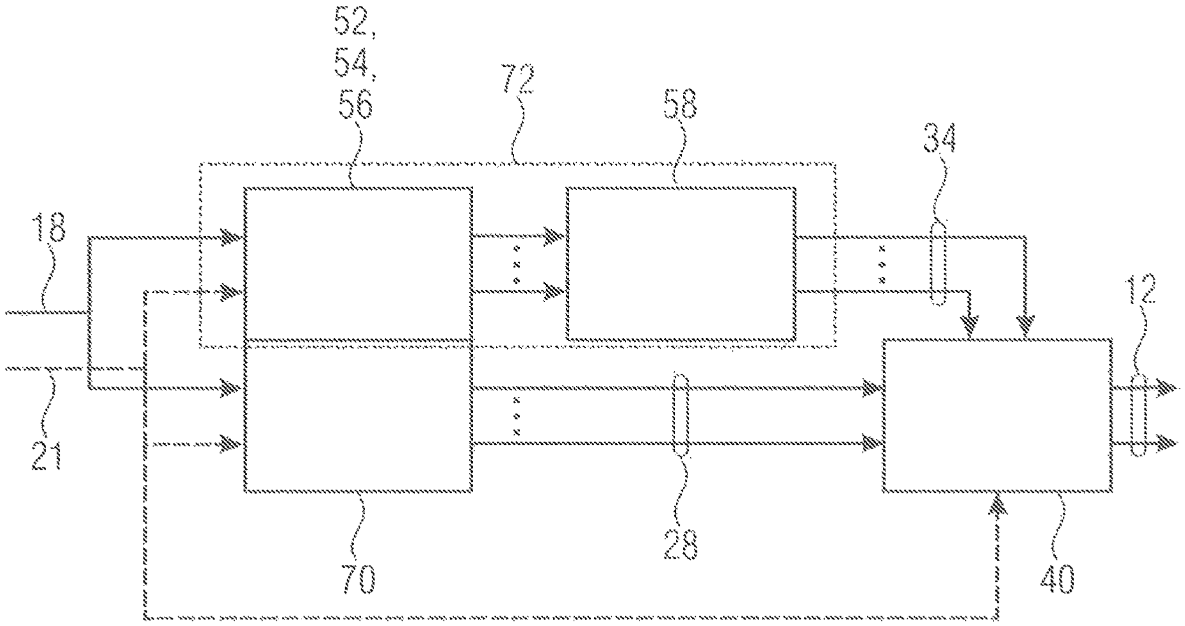
FIG. 2 shows another embodiment for an apparatus for audio rendering, here described to comprise the possibility of horizontal panning for both partial loudspeaker signal sets as well as the equalization for one of them.

That is, object panning according to FIG. 1, may be implemented in a manner leading to a rendering apparatus or object panning processor according to FIG. 2, which generates the loudspeaker signals 12 at the output of composer 40 with two paths which provide partial loudspeaker signals 34 on the one hand and partial loudspeaker signals 28 on the other hand to composer 40, namely one path comprising partial loudspeaker set determiner 70 which receives audio input signal 18 and intended virtual position 21 and outputs the partial loudspeaker signals 28, and another path comprising module 72 which generates partial loudspeaker signals 34 on the basis of the two inputs 18 and 21, and which apparatus and so forth renders an object in 3D space over ANY loudspeaker setup, by

- considering at least one virtual loudspeaker (Top or Bottom) at a vertical (top or bottom) direction. This is done or achieved by the spectral shaping 58 which, as outlined in more detail below, leads to a psychoacoustical cue for the listener that the sound reproduced by the first partial loudspeaker signals 34 arrives from top or bottom, respectively.
- amplitude panning the object, considering the loudspeaker setup plus one or more virtual loudspeakers. The amplitude panning is performed by the vertical panning within composer 40, and the horizontal panning within module 70 and within module 72.
- applying equalization to virtual and/or real loudspeaker signals. The equalization is done by this spectral shaping within spectral shaper 58.
- reproducing each virtual loudspeaker signal over a subset or all loudspeakers of the setup as explained with respect to FIG. 1, the second loudspeaker set 36 may coincide with set 26 and, thus, involve all loudspeakers 14, or may relate only to a subset of loudspeakers 14.

Figure 3:
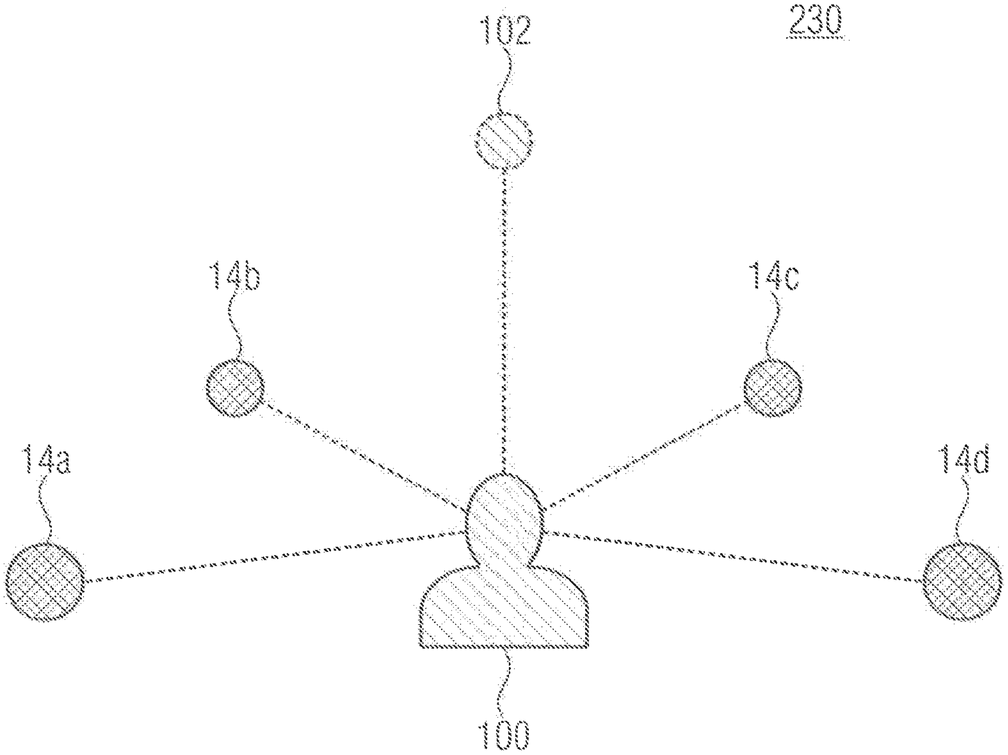
FIG. 3 shows schematically an example loudspeaker setup and a listener positioned in between the loudspeakers, with additionally illustrating the consideration of a virtual top loudspeaker for audio rendering.

In the following, the concept of embodiments of the present application is visualized three-dimensionally. See FIG. 3. In FIG. 3, the listener is indicated by reference sign 100. The individual loudspeakers 14 are distinguished from one another by small letters. In FIG. 3, the loudspeaker setup comprises, exemplary, four loudspeakers. FIG. 3 shows one virtual loudspeaker 102 on top of, or above, listener 100. FIG. 3 is, naturally, just an example. A virtual loudspeaker 102 in the bottom or below listener 100 may be considered, alternatively. Moreover, the virtual loudspeaker 102 may be positioned right above listener 100 even with allowing the listener 100 to move horizontally, namely by means of tracking the listener position, or listener's 100 position may be fixed by default irrespective of the listener 100 being, actually, right below/above the virtual loudspeaker 102.

Stated differently, FIG. 3 shows an example for a positioning of loudspeakers 14, here exemplary four loudspeakers 14*a* to 14*d*, and explain that the embodiments shown in FIGS. 1 and 2, may involve a virtual loudspeaker positioned at a virtual position which is the aforementioned virtual position of rendering associated with the first partial loudspeaker signals 34. That is, FIG. 3 illustrates that the embodiment of FIG. 2 as well as the embodiment of FIG. 1, as far as making use of spectral shaper 58, additionally considers a virtual loudspeaker 102 in addition to the available loudspeakers 14.

Figure 4:
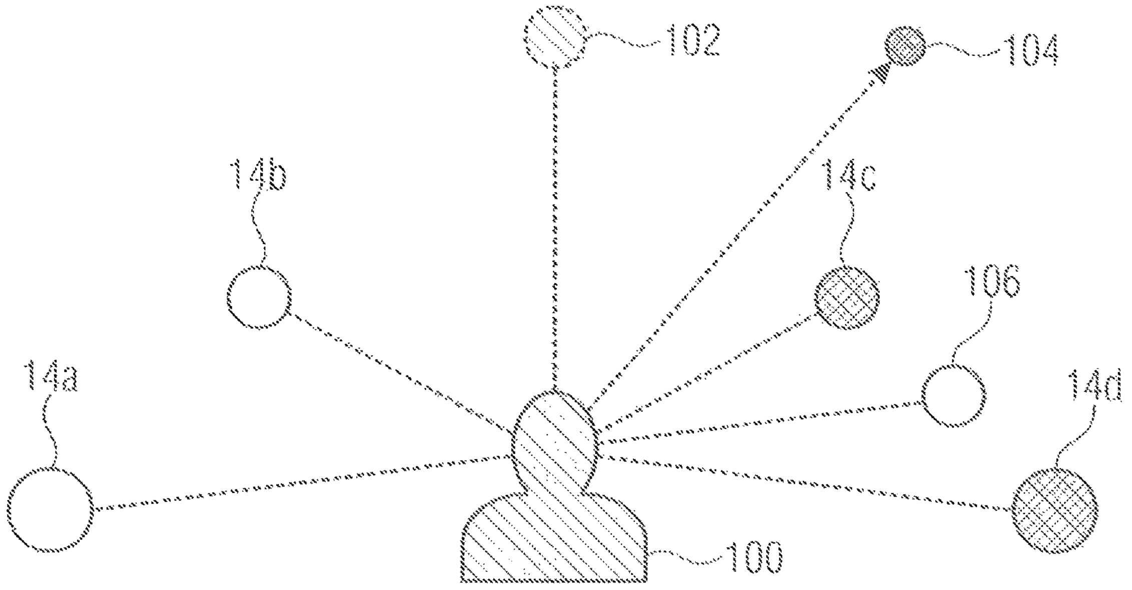
FIG. 4 shows a schematic diagram of the scenario of FIG. 3 with illustrating the first (horizontal) panning.
Figure 5A:
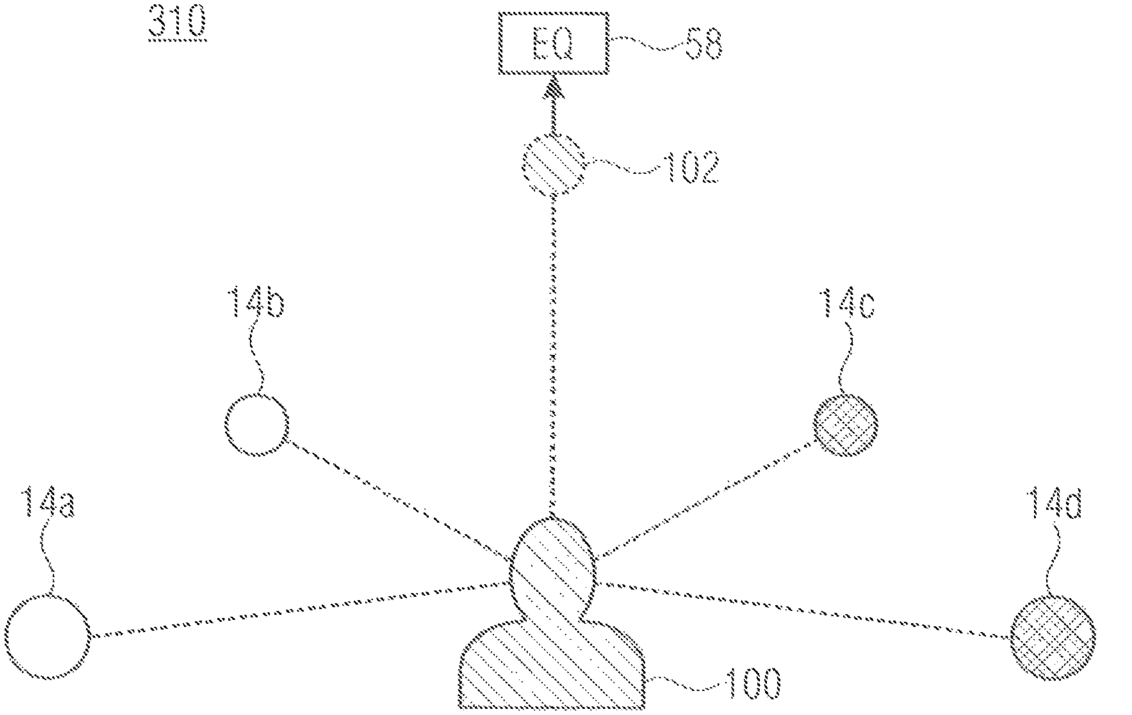
FIG. 5*a* shows the scenario of FIG. 3 with illustrating the usage of the equalization or spectral shaping in order to provide a monaural cue to achieve a virtual top loudspeaker.
Figure 5B:
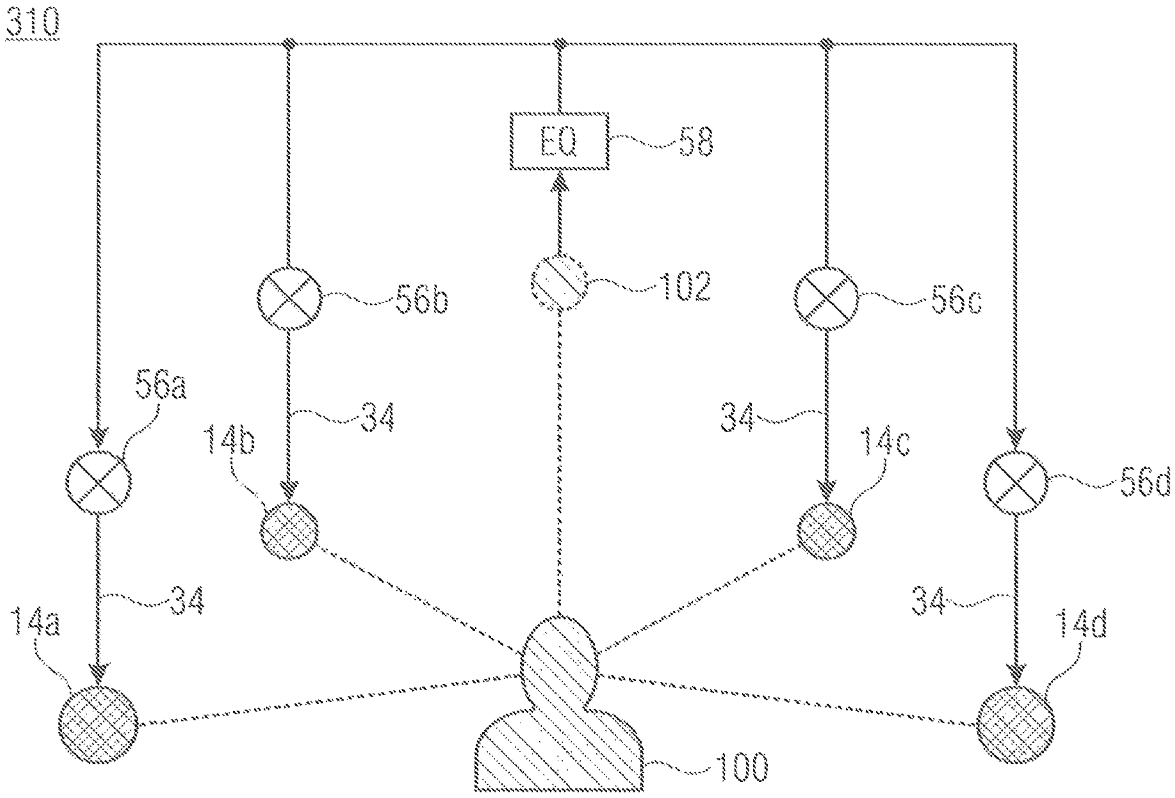
FIG. 5*b* shows the situation of FIG. 5*a* with illustrating the panning between loudspeakers recruited to participate in rendering the virtual top loudspeaker and the gains used to locate the virtual top loudspeaker.

FIGS. 4, 5*a* and 5*b* show, decomposed into individual sub-concepts or steps, as to how the rendering at an intended virtual position 104 using the available loudspeakers 14*a* to 14*d* and the virtual loudspeaker 102 is done.

FIG. 4 illustrated the intended virtual position 104. This position 104 is indicated to be vertically above the layer or plane within which the loudspeakers 14*a* to 14*d* are. FIG. 4 also shows the projection of the intended virtual position 104 into the layer or plane of the loudspeakers 14*a* to 14*d*, i.e., the projection 104 along vertical direction into the layer or plane of loudspeakers 14*a* to 14*d*. The resulting projected position 106, i.e., the projection of the intended virtual position 104, into the layer of loudspeakers 14*a* to 14*d*, is indicated using reference sign 106. Module 70 may use amplitude panning so as to result in partial loudspeaker signals which are associated with a rendering of the audio object at this projected virtual position 106. Thus, FIG. 4 illustrates another circumstance not yet having been described with respect to FIGS. 1 and 2 so far. In particular, the apparatus of FIGS. 1 and 2, respectively, may be configured to select 26 out of all available loudspeakers 14 or out of a group of loudspeakers such as the group of loudspeakers belonging to a certain layer such as loudspeakers 14*a* to 14*d* here in FIG. 4. In particular, as illustrated by use of hatching, only two loudspeakers 14*c* and 14*d* may be selected, namely those of the group of loudspeakers belonging to the horizontal plane of listener 100 are selected to receive corresponding partial loudspeaker signals 28, which are nearest to the protected virtual position 106. According to a different view, the horizontal panning, while resulting in non-zero weights only with respect to a subset of the corresponding loudspeaker layer set, continuously relates to all loudspeakers of the corresponding layer set. Here, only loudspeakers 14*c* and 14*d* would be associated with non-zero weights for horizontal panning, while the other two speakers 14*a* and 14*b* would be associated with zero weights, thereby not participating in the horizontal panning. The two loudspeakers 14*c* and 14*d* of the loudspeaker setup are, thus, used, in addition to the virtual loudspeaker 102. FIG. 4 concentrated on the horizontal panning achieved by module 70 or by determiner 22, respectively, whereas the following figures concentrate on module 72 and its contribution to the final rendering. That is, the following figures will reveal as to how the two loudspeakers 14*c* and 14*d* of the loudspeaker setup along with a virtual top loudspeaker 102 are used for amplitude panning the object at the intended virtual position 104.

Note that the distance of the intended virtual position 104 does not play a major role in the context of this application and that, accordingly, position 104 is depicted as being far away from the listener for sake of an easier perspective representation only. The rendition may, optionally, operate dependent on the direction towards position 104 only.

FIG. 5*a* shows the sub-concept or step according to which equalization or spectral shaping 58 is used for, or applied to, the loudspeaker signal(s) for the virtual loudspeaker 102. Again, FIGS. 3 to 5*b* concentrate on an example where this virtual loudspeaker 102 is a virtual top loudspeaker, but this is only an example. The equalization or spectral shaping 58 may likewise be used in order to form a virtual bottom loudspeaker.

Figure 6:
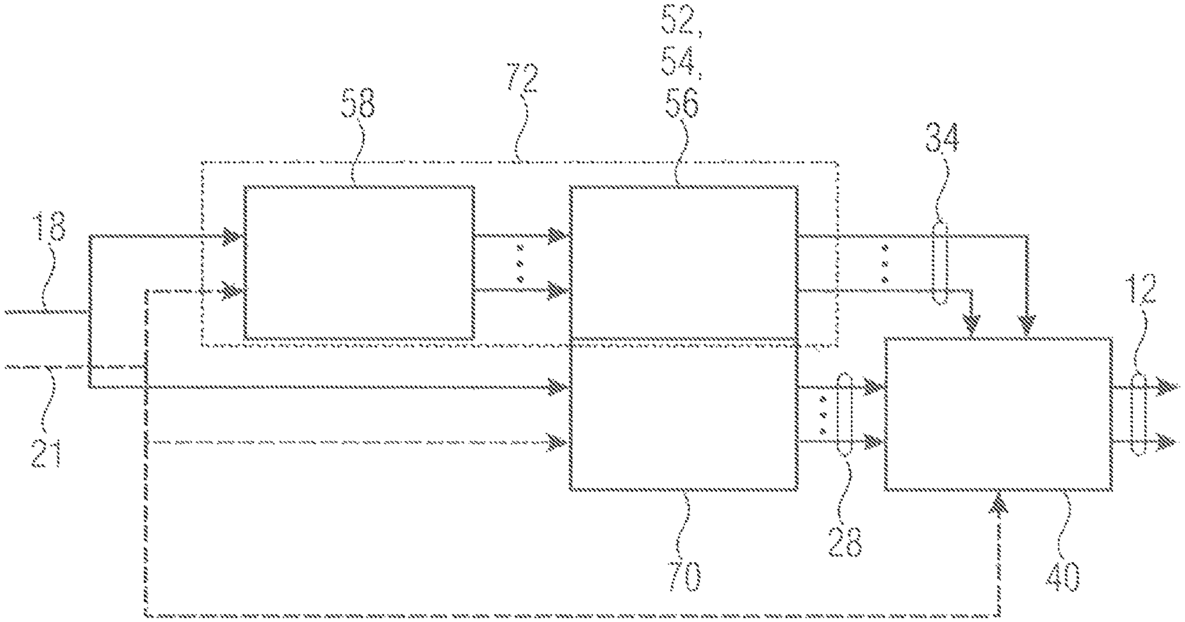
FIG. 6 shows a block diagram of an apparatus for audio rendering varied compared to the embodiment of FIG. 2 by a different order between horizontal panning and equalization for the rendering of the top/bottom virtual loudspeaker.

FIG. 5*b* concentrates on the reproduction of the audio object at the position of the virtual loudspeaker 102. A loudspeaker signal which would be applied to the virtual loudspeaker 102 directly, namely the audio input signal, is subject to the equalizing or spectral shaping 58 and to the horizontal panning here illustrated by the corresponding multipliers 56*a* to 56*d*. The latter multipliers are optional. They are only needed if the virtual loudspeaker position 102 is not static, but positioned so as to be vertically adjusted to the listener position of listener 100, i.e., to be horizontally located such that its vertical projection into the plane of loudspeakers 14*a* to 14*d* coincides with the position of the listener 100 within this plane or layer of loudspeakers 14*a* to 14*d*. FIG. 5*b* exemplary illustrates that the set 36 may encompass all loudspeakers 14*a* to 14*d* or at least all loudspeakers of the corresponding group within one horizontal layer. That is, 5*b* illustrates the reproduction of each second partial loudspeaker signal 34 over a subset or, as illustrated in FIG. 5*b*, all loudspeakers 14*a* to 14*d* of the setup. Since the virtual loudspeaker(s) 102 is not physically available, corresponding equalized signals 34 are reproduced over the mentioned subset of loudspeakers. The gains are applied in total or for each loudspeaker individually to adjust level and resulting direction vector for virtual direction. An alternative implementation that is beneficial due to its reduced computational costs has already been mentioned above and is depicted in FIG. 6. That is, FIG. 6 shows another example for an apparatus for rendering or an alternative embodiment for an object panning processor, namely one where, compared to FIG. 2, the equalization or spectral shaping 58 is performed upstream the horizontal panning by elements 52, 54 and 56 within a module 72. That is, the equalization or spectral shaping so as to result in psycho acoustical cues for the listener, to result in top or bottom loudspeakers 102, is applied to the audio input signal 18 directly rather than onto each partial loudspeaker signal 34 individually. That is, the audio input signal 18 is subject to the equalization or spectral shaping, where upon the panning may be applied such as, optionally, the horizontal panning to control the position of virtual position 102 horizontally, and the vertical panning achieved using the vertical panning factors or gains provided by the vertical panning gain determiner. An even lower computational complexity is achieved if the vertical panning gain for partial loudspeaker signals 34 is applied prior to the optional horizontal panning in between loudspeaker set 36. In the latter case, the equalized or frequency shaped and level-aligned signal may be copied and distributed onto the loudspeakers that have been selected for reproduction of the virtual height loudspeaker 102.

According to the concepts set forth above, the efficient generation of a virtual height reproduction is part of a panning algorithm that allows for using the corresponding virtual height speaker in arbitrary loudspeaker setups. Further details are described in the following.

An (object) panning algorithm/panning processor or an apparatus according to any of FIGS. 1, 2 and 6, can be used for positioning the perceived location of auditory objects within a 3D reproduction space both for static, as well as for moving sound sources.

Due to the efficiency of the underlying concept, it can also be used for static as well as moving listener positions, i.e. also for applications, for instance, in which the position of the listener 100 is tracked, and the rendering by the apparatus is adapted to the listener position. Adaptation examples are set-out below. Furthermore, an apparatus as described herein could even be applied to scenarios with static as well as moving loudspeakers 14.

In typical reproduction scenarios, the loudspeaker positions are fixed, but the listener's 100 position may continuously change. In such a case, the angles under which the listener 100 sees the loudspeakers 14, as well as the respective angles between loudspeakers change as a function of the listener's 100 position.

Conventional panning algorithms, such as VBAP, typically need initialization for their considered invariant sweet spot and loudspeaker positions. During initialization phase, some complex operations are used, such as mapping loudspeakers to pair, triplet, or quadruplet panning groups.

Since in a tracking scenario, relative positioning of loudspeakers 14 and listener 100 frequently changes, it is undesirable to have a complex initialization phase and fixed mapping. The described panning according to FIGS. 1, 2 and 6 addresses these issues and includes a few other novelties related to panning, especially at positions that do not lie inside an area that is covered/surrounded by loudspeakers.

In particular, the following steps assist in achieving an efficient rendering and to deal with speaker setups with more than one layer of speakers 14*a-d* as exemplarily shown in FIGS. 3-5*b* and may be added as functionalities two the apparatuses described herein:

Amplitude panning gains are computed for a horizontal loudspeaker layer, such as in any of the horizontal panning stages in 70 and 72. It might be, that the apparatus is responsive to whether the number of layers of speakers is one or not. If only one layer exists, elements 52,54,56 are not used or are only for positioning the top/bottom virtual speaker position 102 right above/below listener 100. If more than one layer exists, the following is true.

If more than one layer of speakers 14 is present, then amplitude panning gains for more than one loudspeaker layer may be computed such as for a height layer and a bottom layer using module 70 and 72, respectively. This may be done, for instance, if the intended virtual position points to a position vertically inbetween both layers. Note that even more than two layers may be treated that way.

In the panning, any rendered horizontal/azimuthal virtual position of the object, such as 106 in FIG. 4, namely in each layer for which horizontal panning is performed, is considered in the rendering, namely in the vertical panning. Two layers, i.e. two groups of speakers 14, each of which is associated with another horizontal layer at different heights, may, for instance, be selected, one forming set 26, or being used for selecting set 26 thereout, the other forming set 36, or being used for selecting set 36 thereout. The selection out of several (more than two) available layers may be done as described below, namely by taking the layers nearest to the intended virtual positions. The "rendered object position" such as 106 in FIG. 4 for the one exemplary layer shown therein, on each one of the layers may then be used as a virtual loudspeaker for vertically panning the object between the layers. Details are illustrated below.

If the object position is above the highest layer or below the lowest layer, then the object is horizontally panned only on one layer (i.e. on the highest, or on the lowest layer, respectively). In that case, module 72 operates for the virtual top/bottom speaker 102 and the horizontal panning is for adjusting the horizontal position of the top/bottom speaker 102 to the listener position 100 only, if this option is used at all (alternatives are described below according to which this listener position adaptivity is not used), and module 70 operates for the horizontal panning in the used vertically outermost speaker layer or outmost group of speakers 14 forming a horizontal layer. Both modules 70 and 72 would have their sets 26 and 36 of speakers 14 be selected to correspond to, or be part of the mentioned vertically outermost speaker layer or outmost group of speakers 14.

Thus, if the object position 104, 21 lies above (below) the highest (lowest) loudspeaker layer (or in the case that only one loudspeaker layer (e.g. at roughly ear height) is available), then a virtual vertical top (vertical bottom) loudspeaker 102 is considered to perceptually render the auditory object above (below) the loudspeaker layer(s)

A top or bottom equalizer, i.e. a spectral shaping 58 using a corresponding function 60, is applied to the object audio signal and distributed to the loudspeakers that have been selected for top or bottom direction reproduction, i.e. set 36.

Figure 7:
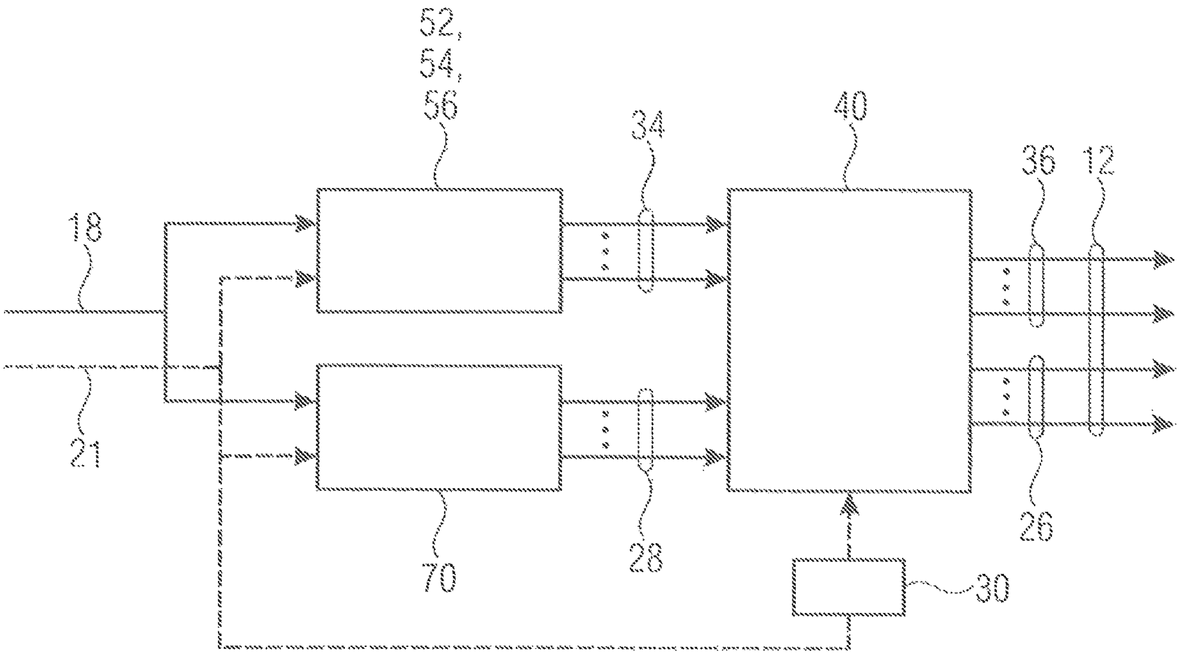
FIG. 7 shows a block diagram of another embodiment for an apparatus for audio rendering or, shown differently, a block diagram of the elements of the apparatus of FIG. 1 participating in rendering the audio object for an intended virtual position in between two available loudspeaker layers.

The steps/functions/blocks participating in the rendering between two layers, or speakers of two layers, is depicted in FIG. 7. To be more precise, FIG. 7 either illustrates an apparatus according to an additional embodiment capable of three-dimensionally panning an audio object to be rendered between two layers of speakers, or FIG. 7 illustrates the cooperation of those portions of the apparatus of FIG. 1, which participate in the rendering in case of the intended virtual position 21 being between two such speaker layers, while the other element shown in FIG. 1 such as the spectral shaper/equalizer 58 do not participate in the rendering in this case (but rather in case of the intended virtual position lying above all speaker layers of speakers 14 or below those available speaker layers). As shown, the input is the audio input signal 18. Horizontal panning is performed by module 70 with respect to one layer and elements 52, 54 and 56 is part of module 72 for the other layer. The corresponding partial loudspeaker signals 28 and 34, respectively, are composed to result into loudspeaker signals 12 by composer 40, with additionally performing the vertical panning using the panning gains provided by determiner 30. The speaker sets 36 and 26, for which the partial loudspeaker signals 34 and 28, respectively, are, may be mutually disjoint as illustrated in FIG. 7 as they belong to different layers. However, it should be noted that the association of speakers 14 to "layers" may be such that one speaker 14 may be associated with different layers. In other words, the grouping of speakers 14 into layer groups of speakers may be such that they overlap. Insofar, the illustration of FIG. 7 is merely an example and may be modified.

The cooperation of the individual elements of FIG. 7 is described in more detail below. As shown and as explained above, the panning, both horizontal and vertical pannings, are controlled by way of the positional information 21. It can either be delivered as additional information such as in form of additional information in a separate data stream, namely separate relative to the audio input signal 18, e.g., as an audio object including at least one channel of audio information and associated metadata defining the intended position. If the audio input signal 18 is a multichannel file without metadata, the intended position 21 of different elements included in the audio signal can be estimated and extracted based on a signal analysis given the known target loudspeaker layout the signal has been produced for. For instance, the audio input signal 18 may comprise a channel associated with a loudspeaker position at the top and/or at the bottom, but the speakers 14 available do not have such speakers. In that case, the intended virtual positon 21 is the position of that channel's speaker's position. Other examples are, naturally, available as well. This may be done for all channels conveyed. The mutual speaker positions to which the channels relate may be maintained by the rendering apparatus.

In accordance with an embodiment, both horizontal pannings, namely the one or more module with respect to partial loudspeaker signals 28 and the one regarding the other partial loudspeaker signals 34 by way of elements 52 to 56 use the same azimuth angle for panning. That is, the same azimuth angle is used for both layers. In other words, the horizontal panning is done in a manner so that the projected virtual positions 106 depicted in FIG. 4 coincide in a vertical projection onto one another. Naturally, this may be implemented differently. The restriction is not necessary and different azimuth angles may be used for different layers.

A beneficial feature of the embodiments discussed herein is the fact that they do not require extensive initialization. Instead, panning parameters are computed directly from given or changing listener and loudspeaker coordinates or positions. The initialization of the rendering is not dependent on predefined pairs, triplets, or quadruplets of loudspeakers.

Figure 8:
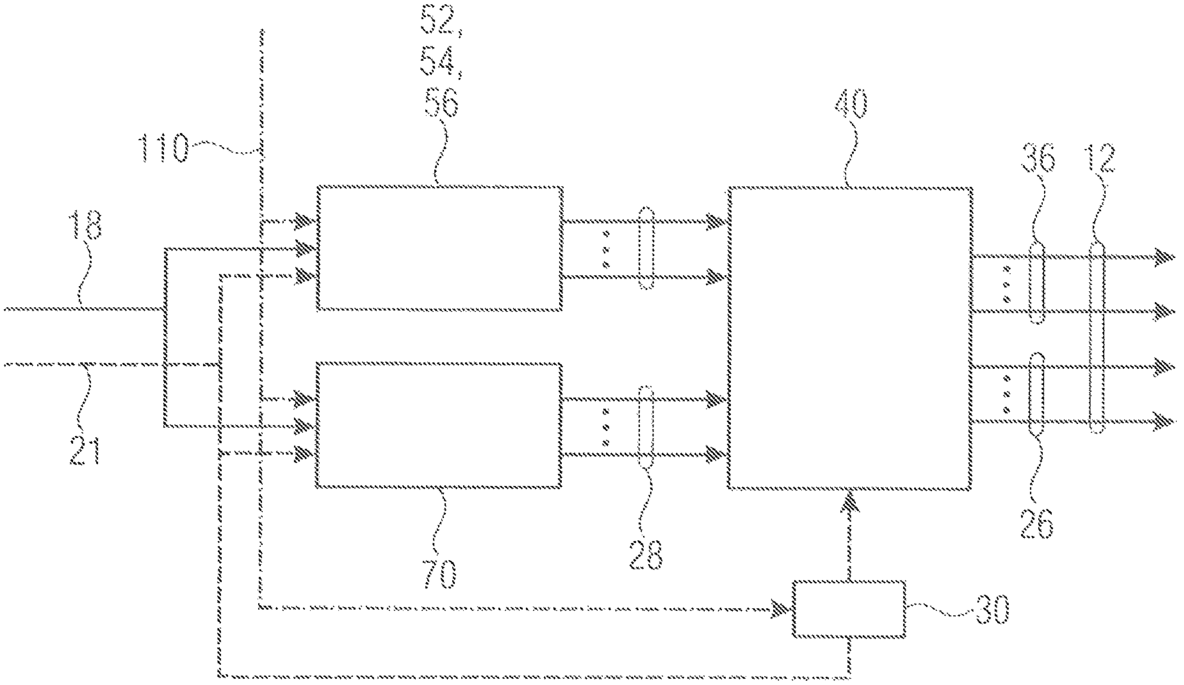
FIG. 8 shows a block diagram illustrating, in addition to the elements of FIG. 7, the possibility of considering the listener's position.

FIG. 8 illustrates the fact that both, horizontal and vertical panning, may be controlled by information on the listener position, namely information 110. To be more precise, imagine the intended virtual position 21 is represented by solid angles indicating a certain direction from which the listener 100 shall perceive the audio object to be rendered. Depending on the listener position 110, aside from any adaptation of the virtual top/bottom speaker's position to the listen position, if any, a horizontal panning, which is dependent on the listener position, might be applied in order to attain this perception direction for the listener. Same is true in case of the listener position information 110 being indicative of the position of listener 100 not only in terms of horizontal position but also in terms of height such as the height of the position of the listener's ears.

As is clear from the above description, apparatuses according to embodiments of the present application are not restricted to deal with loudspeaker setups where the available loudspeakers 14 are arranged in one layer only. The latter example had been depicted in FIGS. 3 to 5*b*. Rather, loudspeakers 14 being available for the apparatus, may be associated with different layers. The partial loudspeaker signals 34 on the one hand and partial loudspeaker signals 28 on the other hand which have been discussed above, or, differently speaking, the two paths into which module 70 and 72, respectively, are serially connected, may be associated with one or more of such speaker layers. For the following description, we assume that each of same is associated with one speaker layer. That is, each is associated with one group of loudspeakers forming one layer. Some loudspeakers may be associated with more than one layer as will become clear from the following description and has already been stated above. The attribution or association of layers to the individual paths, namely path of module 70 and path of module 72, may be fixed or may be subject to adaptation to the intended virtual position 21 and/or the listener position 110. This has already been discussed above: If there are more than two layers available, two layers may be selected in case of the intended virtual position being in between a pair of these layers and these layers are associated with the two paths. In case of the intended virtual position 21 exceeding all layers available, and there is no real top or bottom speaker available, then the outermost layer nearest to the intended virtual position is selected as the loudspeaker layer for which both paths are used.

Given an arbitrary loudspeaker setup, initialization may involve only that each loudspeaker 14 is classified as belonging to one or more of the following categories:

Layer 1:

Typically this loudspeaker layer is used for panning objects horizontally (approx. on ear height of a seated listener).

Layer 2 to N:

Optionally, loudspeakers in a second layer can be defined, such as loudspeakers in a height (top or bottom) layer. These are layers vertically above or below Layer 1. The loudspeaker layers can, thus, be more than two. The distinction between Layer 1, being on ear height, and any other layer or the other layers is optional.

Top:

Loudspeaker(s) over which vertical top direction is reproduced. This can be a dedicated loudspeaker, or a subset of loudspeakers of other layers.

Bottom:

Loudspeaker(s) over which vertical bottom direction is reproduced. This can be a dedicated loudspeaker, or a subset of other layers.

The above description is not limited to regular setups, where regular would e.g. imply that an equal number of loudspeakers is present in every layer, having equal angles/distances between them, or that all layers completely surround the listener, or that all layers have loudspeakers arranged at exactly the same vertical angle as seen from the listener.

Actually, as mentioned before, any arbitrary setup can be used. The different loudspeakers could be positioned at different/arbitrary azimuth angles, and at different/arbitrary elevation angles (i.e. different heights). Loudspeakers considered to be part of one layer do not necessarily need to lie within a plane. Variations in their vertical positioning is allowed.

Figure 9:
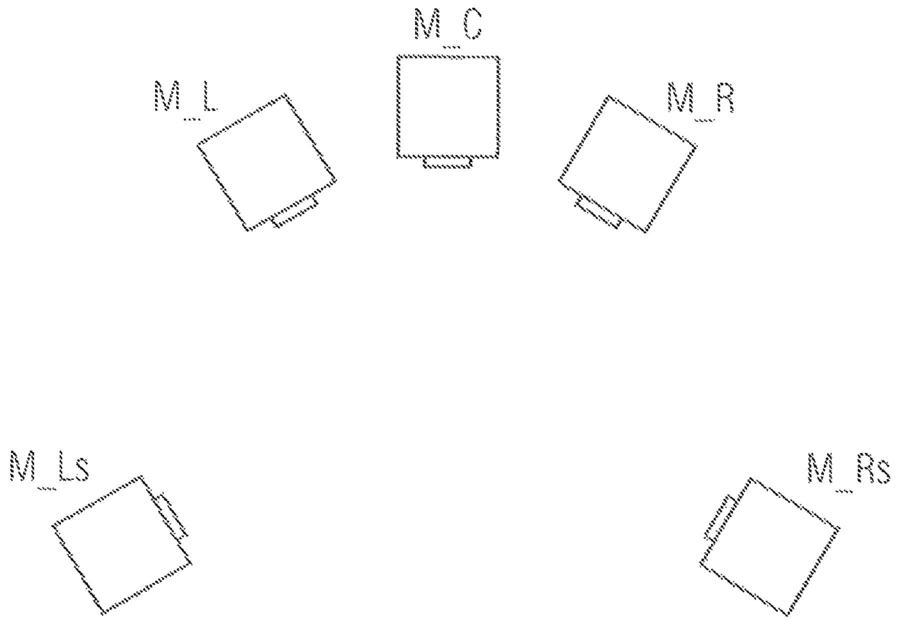
FIG. 9 shows a schematic top view of a possible loudspeaker setup, here a 5.0 loudspeaker setup.
Figure 10:
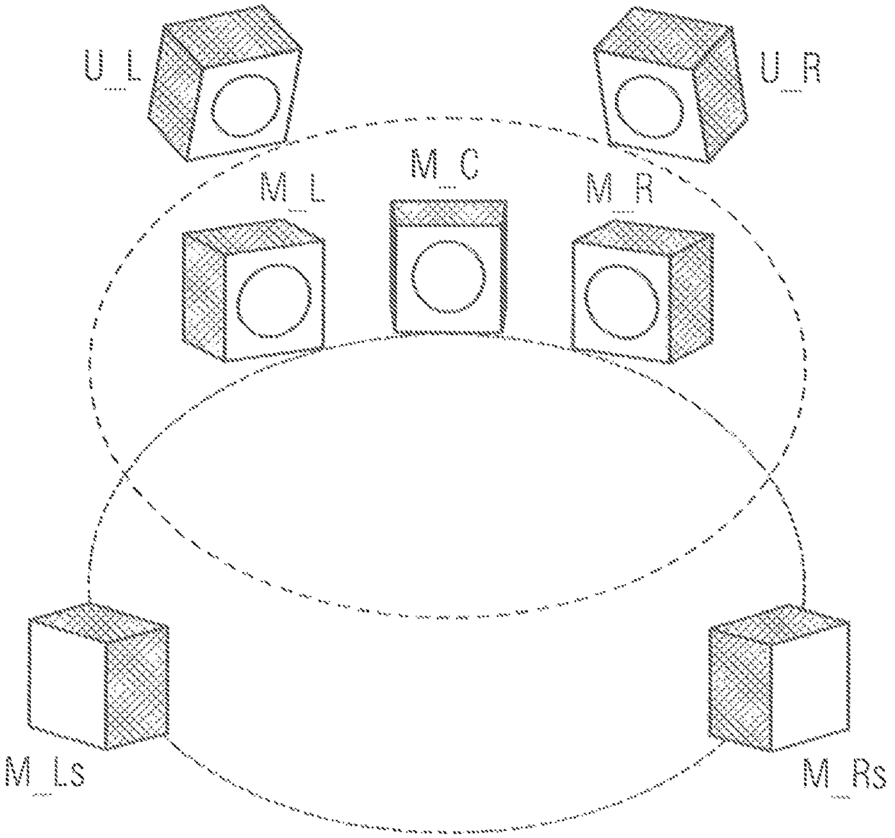
FIG. 10 shows another schematic three-dimensional view of another example for a loudspeaker setup, here a 5.0+2H loudspeaker setup.

FIGS. 9 and 10 show example realizations/example classifications. These figures shall exemplify the procedure of allocating the different available loudspeakers to the different layers. Those are only examples, different mappings in the same situation(s) would be possible and are subject to the user's preferences.

FIG. 9 shows a classification using a 5.0 loudspeaker setup. Here as well as in following figures, the following identifiers are used for simplicity to indicate available speakers 14: The horizontally arranged loudspeakers, that would usually form the setup that is installed at roughly ear height of a listener is labeled in the form "M_X", where M is an indicator for MIDDLE, hinting that this layer is usually between the upper and lower loudspeaker layers. This would, thus, be a Layer 1 in the above nomenclature. The X identifies the specific loudspeaker in this layer, e.g. M_L would be the "front left loudspeaker in the middle layer". Similarly, we identify an upper layer loudspeaker as "U_X", so "U_Rs" would be the "right surround loudspeaker in the upper layer". Loudspeakers in a lower layer would be identified by "L_X". U and L speakers are, thus, speakers of Layers 2 . . . N in the above nomenclature. A loudspeaker mounted at the ceiling (i.e. either directly above the listener, or directly above the center of the loudspeaker array) is denoted Top. Respectively, the term Bottom is used for loudspeakers directly below the listener, or directly below the center of the loudspeaker array. In FIG. 9, the classification of speakers would be:

| Loudspeakers | Categories |
|---|---|
| M_L, M_R | Layer 1, Top, Bottom |
| C | Layer 1 |
| M_Ls, M_Rs | Layer 1, Top, Bottom |

Horizontal panning by module 70 would be done using all available loudspeakers (Layer 1). Top and Bottom directions are rendered using module 72 over all loudspeakers except the center (C). That is, set 36 would comprise all loudspeakers except the center, while set 28 would encompass all speakers.

Please note that this is an explicit decision for this example. Of course, the center loudspeaker could also be used for height rendering.

A further classification using a 5.0+2H loudspeaker setup is depicted in FIG. 10. Here, two layers exist in the available set-up and the classification or association would be:

| Loudspeakers | Categories |
|---|---|
| M_L, M_R | Layer 1, Bottom |
| C | Layer 1 |
| M_Ls, M_Rs | Layer 1, Layer 2, Top, Bottom |
| U_L, U_R | Layer 2, Top |

In this example, the middle layer surround loudspeakers (M_Ls and M_Rs) are used for both layers (Layer 1 and Layer2), since otherwise Layer 2 would not surround the listener. That is, Layer 1 and Layer 2 speakers would be used for inter-layer panning as illustrated in FIGS. 7 and 8, e.g. those of Layer 1 for set 26 and those of Layer 2 for set 36 or vice versa, and as soon as the intended virtual position is outside both layers, to the top or bottom thereof, then speakers belonging to the class Top are used for set 36 with active equalization 58 and with using Layer 2 speakers for set 26, or the class Bottom speakers are used for set 36 with active equalization 58 and with using Layer 1 speakers for set 26.

Alternative classifications in this setup could be to decide for rendering without a Layer 2. The Top could be rendered using only the elevated loudspeakers U_L and U_R, or alternatively, the top could also be rendered by a combination of the U_L, U_R, M_Ls, and M_Rs as described before.

Further examples are readily derivable. E.g. with bottom layer loudspeakers, or with more or less elevated loudspeakers, or with more or less loudspeakers in the middle layer, or with more arbitrary or irregular loudspeaker setups.

In the following, the case of rendering an object in 3D is explained for an example case where the object is panned in a direction (as seen from the listener) that lies between two physically present loudspeakers layers (which are at different height). This had already been discussed above with respect to FIGS. 7 and 8, but it is illustrated more clearly in FIGS. 11 and 12. A 5.0+4H loudspeaker setup is exemplarily illustrated here. Examples for a position of the listener 100 and the position of the audio object 104 are indicated. The speakers are classified into two separate layers discriminated using different line types, dashed for second layer and continuous for first layer.

Figure 11:
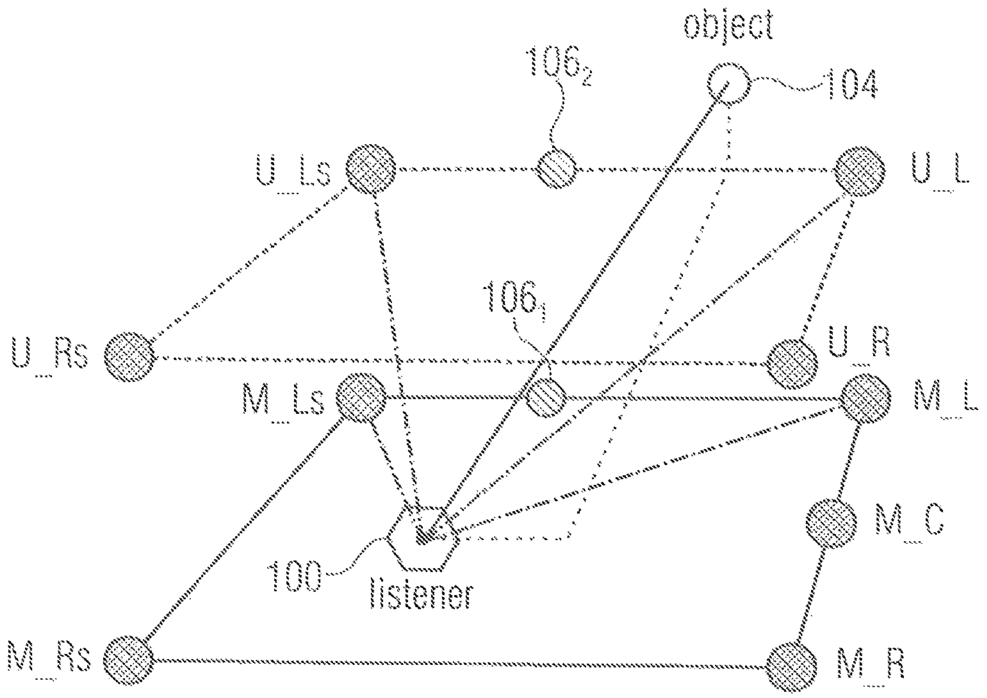
FIGS. 11, 12 show schematic diagrams so as to illustrate the two-stage process in performing the audio rendering of an object at an intended virtual position in between two available layers, here for the example of using a 5.0+4H loudspeaker setup.

The object is amplitude panned in the first layer by giving the object signal to loudspeakers in this layer with different gains 24, e.g. by giving the object signal to M_L and M_Ls such that it is amplitude panned to bottom layer gray dot position $106_1$ in FIG. 11. Similarly, the object is amplitude panned in the second layer to the height layer gray dot position $$106_2$$

in FIG. 11. As can be seen, positions $$106_1$$

and $$106_2$$

may be selected so that they vertically overlay each other and/or so that the vertical projection of intended position 104 and the positions $106_1$ and $106_2$ coincide as well.

Figure 12:
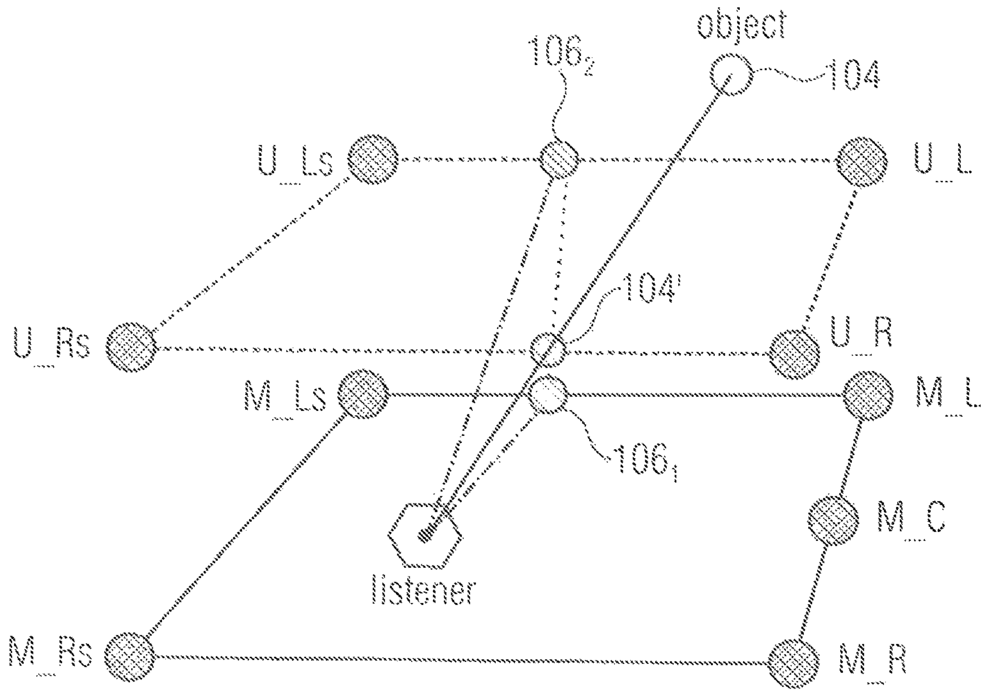

FIG. 12 illustrates rendering the final object direction by applying amplitude panning between the layers, i.e. illustrates the vertical panning. Considering the virtual objects at positions $106_1$ and $$106_2$$

as virtual loudspeakers, amplitude panning by elements 30 and 40 is applied to render the virtual object at intended position 104, between the two layers appearing in the direction of the object. The result of this amplitude panning between the layers are two gain factors 32 with which the two layers' signals 34 and 28 are weighted.

This weighting for the horizontal panning between (real) loudspeaker layers can additionally be frequency dependent to compensate for the effect that in vertical panning different frequency ranges may be perceived at different elevation [13].

Rendering Objects above or below a layer or outmost layer is further inspected now, as an additional information relative to the description set forth above.

An object may have a direction or position 104 which is not within the range of directions between two layers as discussed wrt FIGS. 11 and 12. This case is discussed wrt FIGS. 13 and 14. An object's intended position 104 is above or below a (physically present) layer, here above any available layer and, in particular, above the upper one indicated in dashed lines. As an example, the object has a direction/position 104 above the top loudspeaker layer of the 5.0+4H setup which has been used as an example set-up in FIGS. 11 and 12 as well.

Figure 13:
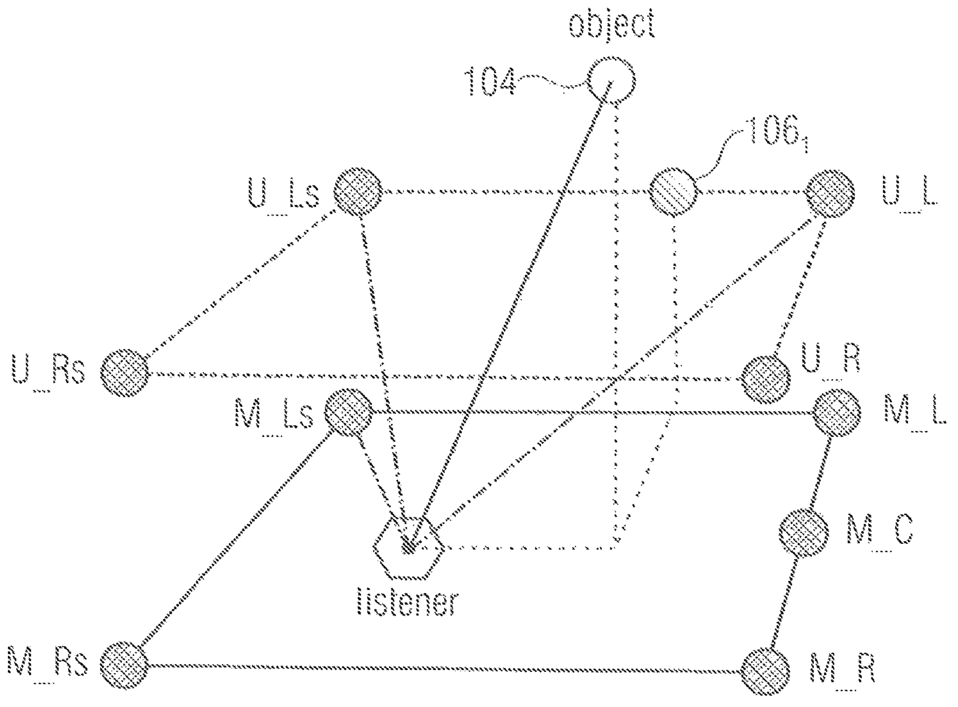
FIGS. 13, 14 illustrate the two-stage rendering of an object at an intended virtual position vertically offset to the available layers, here exemplary to the top of all layers.

In this case, horizontal amplitude panning is applied by module 70 to the height layer to render the object in that layer. The resulting position $106_1$ of the rendered object is indicated as height layer gray dot position $$106_1$$

in FIG. 13.

Figure 14:
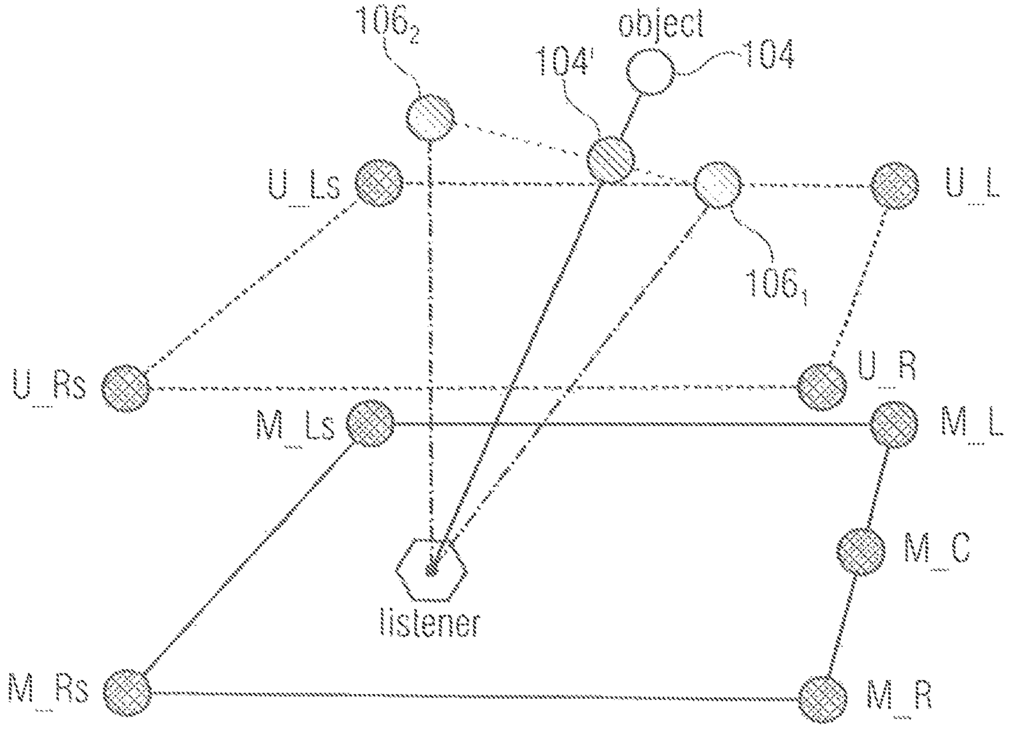

Then, panning is applied between position $$106_1$$

in the height layer and the vertical direction/position $$106_2,$$

indicated as gray dot position $$106_2$$

in FIG. 14. The resulting 3D panned virtual object is indicated as gray dot position 104'.

Since there is no real loudspeaker at the vertical top or bottom direction, the vertical signal at $106_2$ is equalized by module 58 to mimic coloration of top or bottom sound respectively (see subsequent explanation for more details on the equalization). The vertical signal is then given to the loudspeakers designated for top/bottom direction, i.e. set 36.

As to the rendering of the virtual Top or Bottom loudspeakers 102 the following may be said.

In general, different approaches can be chosen to render the virtual vertical Top or Bottom loudspeakers.

In general, two different approaches can be chosen:

(1) Virtual top/bottom rendered above the actual listening position as indicated by 110.

(2) Virtual top/bottom speaker is rendered above a "sweet spot" or a center of the (main) loudspeaker array As application examples, (1) could be beneficially chosen, if the listener position can be tracked, while (2) could be chosen if the possibility for listener tracking is not available.

A simple implementation uses the same gain for each loudspeaker selected for Top or Bottom rendering, i.e. the gains 54 would be chosen the be equal. This scheme works well. (It can e.g. be used as the simplest implementation and is especially useful, when the listener position is not tracked and such not known.)

Especially when the listener is not centrally located within the loudspeaker setup, then the following considerations can improve top and bottom rendering:

- If there is a height layer and one wants to pan above that height layer, gain factors 54 applied to the (height-layer) loudspeakers 36 may be used for the top direction, such that the resulting panning direction vector points vertically upwards (or alternatively towards a virtual top loudspeaker position 102), i.e. so that 102 is right above the listener 100.
- Same for bottom direction, when there is a bottom loudspeaker layer.
- If there is no height layer and one wants to pan above the horizontal layer, gains are applied to the loudspeakers such that the amplitude panning vector vanishes (no horizontal direction bias). Simpler, one can apply gains 54 to the loudspeakers such that signal amplitude or power at the listener is the same for each top/bottom rendering loudspeaker.
- Same for bottom direction, when there is no bottom loudspeaker layer.

In the following, the equalizer (or spectral shaper) 58 is further exemplified using further details. The main cues enabling the listener 100 to localize a sound source in the horizontal plane are differences between the left and right ear input signals (interaural time differences (ITDs) and interaural level differences (ILDs)). The primary cues for estimating the vertical position of a sound source are spectral variations due to reflections produced by the listener's head, torso, and pinnae. Such cues are often called monaural cues (MCs), called psycho-acoustical cue in the above description.

The specific ILDs, ITDs, and MCs, which occur due to the unique body features of each individual and the considered direction of incidence, are commonly sub-summed under the term Head Related Transfer Functions (HRTFs). Especially the MCs are highly individual. Still, there are some common features that influence the height perception in general.

By shaping the frequency content of a specific source signal that is received from one direction, the illusion that this sound actually comes from a different elevation and/or front-back-orientation on the same cone of confusion can be supported. This corresponds to changing MCs and is the purpose of the equalizer (EQ) 58.

A simple but well working implementation of the concept of using virtual top/bottom loudspeakers, and equalization of these signals, uses a specific static EQ for the top and bottom direction respectively.

Figure 15:
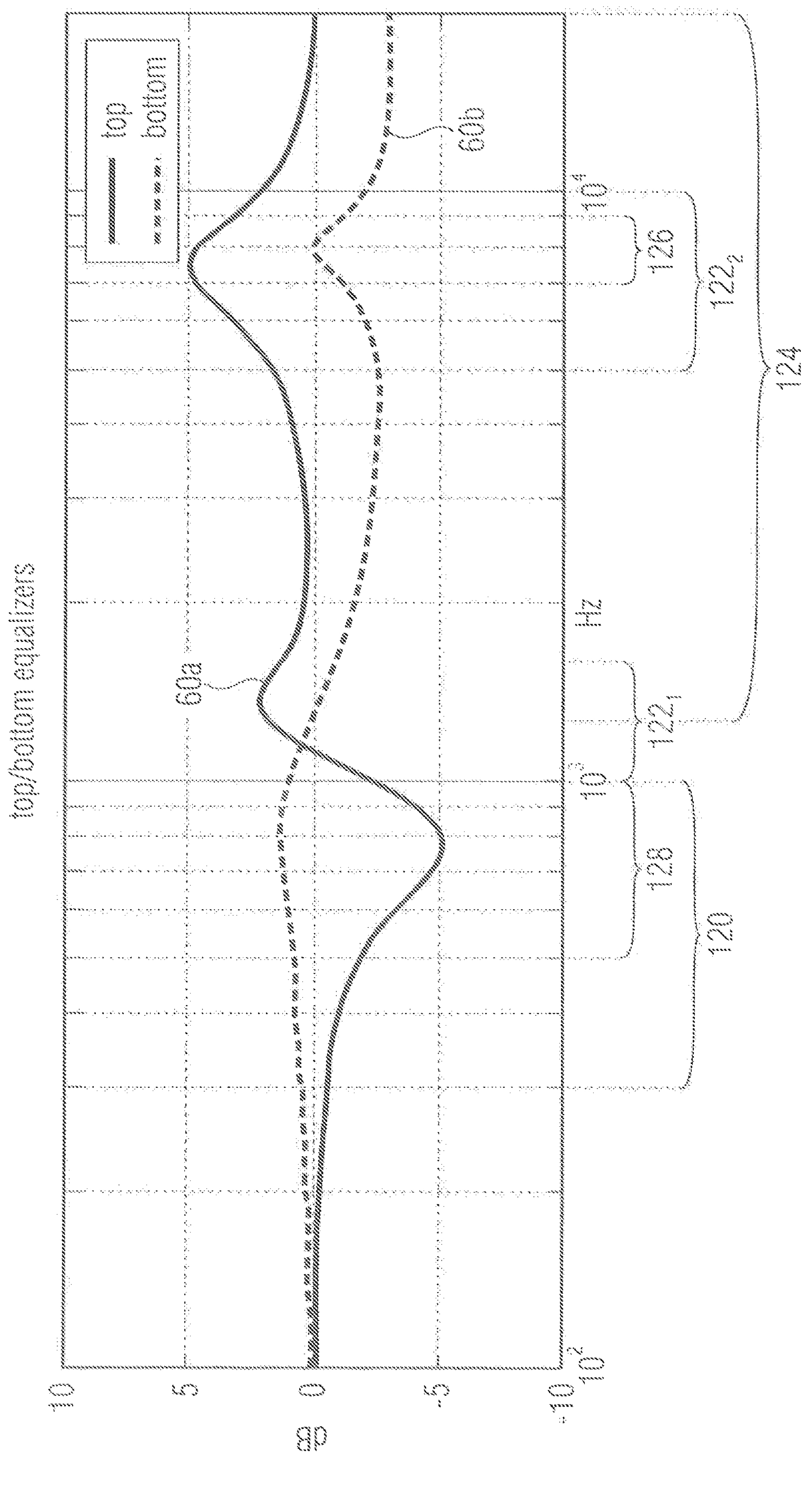
FIG. 15 shows examples for shaping functions used in the equalization or spectral shaping so as to form a monaural cue for rendering the virtual top/bottom loudspeaker signal.

FIG. 15 shows two such heuristically determined equalizers as examples or, differently speaking, shows a shaping function 60*a* for virtual top speaker rendering and a shaping function 60*b* for virtual bottom speaker rendering. These have been determined by analysis of measured HRTF data, corresponding to cues implying a source above or below a listener. HRTFs of many subjects were considered and the EQs were determined by ignoring spectral changes which vary too much between subjects.

The equalizer 60*a* for top direction typically has one or more notches and/or peaks. Typically there is a notch below 1 kHz and one or more peaks at higher frequencies. An equalizer 60*b* for bottom direction includes the effect of "body shadowing", that is, overall high frequencies are attenuated. In other words, by function 60*a*, the second partial loudspeaker signals 34 are, relative to the audio input signal 18, dampened in a notch spectral range 120 between 200 and 1000 Hz and amplified within one or more in peak spectral ranges $\mathbf{122}_1$ and $\mathbf{122}_2$—here there are exemplarily two—lying between 1000 and 10 kHz. By function 60*b*, the second partial loudspeaker signals 34 are, relative to the at least one audio signal, dampened in a spectral range 124 above 1000 Hz with a reduction of the dampening within a spectral subrange 126 within the spectral range 124, which subrange is located between 5 and 10 kHz. Further, function 60*b* may, es depicted in FIG. 15, lead to an amplification of the signals 34 within a spectral range 128 between 500 Hz and 1 kHz. Naturally, the ranges and examples may be varied.

The effective overall spectrum of the acoustic signal arriving at the listener is determined partially by non-EQ'ed signal (amplitude panning within a layer) 28 and partially by EQ'ed signal (signal from virtual top/bottom) 34. Thus the effective overall EQ is a linear combination of unity and the top/bottom EQs 60*a*/60*b*. In that way, the EQing at the listener is fading in as a source 104 moves towards top position (or correspondingly towards bottom position).

Such a continuous fade/change in the amount of EQing is specifically beneficial, since the human auditory system can use those changes in the spectrum of the received signal to judge its location. Especially in tracked scenarios, this changes can be used to distinguish weather a specific spectral feature is a property of the actual signal, or changes while the listener is moving, and it can such be interpreted as a feature related to the source location.

Summarizing, a reproduction of object based audio or multichannel audio with reproduction of elevated or lowered height sounds (top and bottom) is enabled. A playback of input audio signals (featuring sound intended for reproduction over elevated or lower loudspeaker layers) over arbitrary loudspeaker setups is possible. Here, "loudspeaker setups" does also include devices and topologies like soundbars, TVs with built in loudspeakers, boomboxes, soundplates, loudspeaker arrays, smart speakers, and so forth. There is no need to have elevated or lower loudspeaker layers. Thus, a perceptual effect of top or bottom sounds in almost any arbitrary loudspeaker setup (even without elevated or lower loudspeakers) is made possible.

The embodiments are computationally efficient, such that it can also be beneficially used in scenarios where the (changing) listener position is known and/or (constantly) tracked by the playback system.

The embodiments can be used for channel-based audio, object-based audio, and scene-based audio (e.g. Ambisonics) input format signals.

Compared to rendering methods which are HRTF based, it is to be emphasized that the embodiments do not aim at simulating detailed specific binaural cues for specific object positions in all possible directions (which might be difficult to achieve over a wide range). Instead, a good simulation of cues is produced that evoke the perception of a sound source above or below the listener (i.e., produce a virtual source above or below) at one specific position/direction. Thus, it is tried to mimic the perception for those two directions (top/bottom 102) in a very good/convincing way. A benefit of these two specific directions chosen is that, besides the spectral cues, the two other dominant spatial audio cues (i.e. ITDs and ILDs) are minimal; theoretically, no ITD and no ILD occurs for sound sources perfectly above or below a listener, i.e., the particle velocity in horizontal direction is close to zero for the direct sound from the sound source. Thus, the two stage approach with panning horizontally and vertically, potentially with virtually rendering the top/bottom speaker 102, is stable and leads to high accuracy.

In the following, we describe some further example selection criteria how loudspeakers of the plurality of loudspeakers could automatically be assigned to a set or a layer of loudspeakers for reproduction of a virtual loudspeaker Criteria for selecting the loudspeakers for the sets/layers:
- Chose every layer such, that a 360 degree panning around a listener is possible.

Choice of loudspeakers for the reproduction of the virtual height channel:
- Use multiple loudspeakers, such that
- 1) choose loudspeakers that are already at elevated positions
- 2) considering 1), select (further) loudspeakers to achieve an array surrounding the listener
- The selected loudspeakers should as good as possible enable that they can reproduce the signal for the virtual height channel such that: the generated soundfield at the listener position has zero or small particle velocity in horizontal direction.
- If multiple suitable loudspeakers are available, either all of them can be used, or the selection procedure could be as follows:
  - If possible, select loudspeakers symmetrically around the listener (ideally as (rotationally) symmetrical as possible)
  - If loudspeaker are available that are already arranged at elevated positions (up or down) towards the desired elevation position of the intended virtual height source
    - the elevation angle of the loudspeakers should be as large as possible, i.e., select the loudspeakers with the biggest elevation angles (as vertical as possible)

Ideally, select as few loudspeakers as possible to fulfill the above criteria

Of course, the loudspeakers can also be selected/assigned by the user “by hand”.

Possible input parameters for (possibly adaptive) rendering are:

The angles (azimuth and elevation) from the listener position to the loudspeakers
- This is under the assumption that all loudspeakers are equally far away and produce similar level at the listening position
- If they are not equally far away, the level and/or delay can be balanced to achieve equal level/time of arrival at the listener position In a scenario where the listener is tracked, also the distance to each loudspeaker is needed in addition to the angles, so that level and/or delay can be adapted.
- Such a level and delay adaption in a tracked scenario can also be beneficial to achieve the above mentioned “small particle velocity in horizontal direction” criterium for the reproduction of the virtual height signals.

To conclude, the embodiments described herein can optionally be supplemented by any of the important points or aspects described here. However, it is noted that the important points and aspects described here can either be used individually or in combination and can be introduced into any of the embodiments described herein, both individually and in combination. As an outcome of the latter, the above description inter alia, includes an apparatus for generating loudspeaker signals 12 for a plurality of loudspeakers 14 so that an application of the loudspeaker signals 12 at the plurality of loudspeakers 14 renders at least one audio object at an intended virtual position 104, the apparatus comprising an interface 16 configured to receive an audio input signal 18 which represents the at least one audio object, a first panning gain determiner 22, configured to determine, depending on the intended virtual position, first panning gains 24 for a first set 26 of loudspeakers of the plurality of loudspeakers, which are arranged within, or form, a first horizontal layer, the first panning gains 24 defining a derivation of first partial loudspeaker signals 28 from the at least one audio input signal 18, which are associated with a rendering of the at least one audio object at a first virtual position 106 upon application of the first partial loudspeaker signals 28 onto the first set 26 of loudspeakers, a vertical panning gain determiner 30, configured to determine, depending on the intended virtual position, further panning gains 32 for a panning between the first partial loudspeaker signals 28 and second partial loudspeaker signals 34 which are to be applied to a second set 36 of loudspeakers, which is vertically offset relative to the first layer set, so as to be arranged in, or form, a second horizontal layer, and is associated with a rendering of the at least one audio object at a second position 102 so as to pan between the first virtual position 106 and the second position 102, wherein the apparatus is configured to compose the loudspeaker signals 12 from the audio input signal 18 using the first panning gains 24 and the further panning gains 32. A second panning gain determiner 52 is also comprised, which is configured to determine, depending on the intended virtual position, second panning gains 54 for the second set of loudspeakers, the second panning gains 54 defining a derivation of the second partial loudspeaker signals 34 from the at least one audio input signal, and the apparatus is configured to compose the loudspeaker signals 12 from the audio input signal 18 using the first and second panning gains and the further panning gains. The first and second panning gain determiners 22, 52 are configured to select the first and second sets 26, 36 of loudspeakers of the plurality of loudspeakers so that the first and second layer sets have, among horizontal layers which the plurality of loudspeakers are distributed onto, the intended virtual position 104 vertically therebetween. Note that the first set 26 of loudspeakers and the second set 36 of loudspeakers may partially overlap, i.e. one loudspeaker may be contained by both sets 26 and 36. To be more precise, the plurality of loudspeakers may be distributed onto the horizontal layers in a manner that, for each horizontal layers, the loudspeakers belonging to that horizontal layer surround, horizontally (i.e. in horizontal projection) a listener position, or, differently speaking, allow for, horizontally, a 360 degree panning around the listener position, and for sake of achieving this circumstance, for instance, at least one pair of horizontal layers may share one or more of their loudspeakers. That is, horizontality and vertical offsetness of the horizontal layers may be abstracted to an extent that sometimes, such as for at least one pair of horizontal layers, one or more loudspeakers belong to more than one of the horizontal layers, respectively. In even other words, the above description, inter alia, includes an apparatus for generating loudspeaker signals 12 for a plurality of loudspeakers 14 so that an application of the loudspeaker signals 12 at the plurality of loudspeakers 14 renders at least one audio object at an intended virtual position 104, wherein the plurality of loudspeakers are distributed onto one or more horizontal layers, the apparatus comprising an interface 16 configured to receive an audio input signal 18 which represents the at least one audio object, a first loudspeaker signal set determiner 70, configured to determine, depending on the intended virtual position, first panning gains 24 for a first set of loudspeakers 26 of the plurality of loudspeakers, and use the first panning gains 24 to derive first partial loudspeaker signals 28 from the at least one audio input signal 18, which are associated with a rendering of the at least one audio object at a first virtual position 106 upon application of the first partial loudspeaker signals onto the first set 26 of loudspeakers, a second loudspeaker signal set determiner 72, configured to, by spectral shaping, derive second partial loudspeaker signals 34 from the at least one audio input signal 18, the second partial loudspeaker signals 34 being associated with a rendering of the at least one audio object at a second virtual position 102 upon application of the second partial loudspeaker signals 34 onto a second set of loudspeakers 36, the second virtual position being above or below the one or more horizontal layers, and a vertical panning gain determiner 30 configured to, depending on the intended virtual position, determine further panning gains 32 for the first and second partial loudspeaker signals so as to pan between the first and second virtual positions, and a composer 40 configured to compose the loudspeaker signals from the first and second partial loudspeaker signals using the further panning gains 32. Again, note that the first set 26 of loudspeakers and the second set 36 of loudspeakers may partially overlap, i.e. one loudspeaker may be contained by both sets 26 and 36. To be more precise, the plurality of loudspeakers may be distributed onto the horizontal layers in a manner that, for each horizontal layer, the loudspeakers belonging to that horizontal layer surround, horizontally (i.e. in horizontal projection) a listener position, or, differently speaking, allow for, horizontally, a 360 degree panning around the listener position, and for sake of achieving this circumstance, for instance, at least one pair of horizontal layers may share one or more of their loudspeakers. That is, horizontality and vertical offsetness of the horizontal layers may be abstracted to an extent that sometimes, such as for at least one pair of horizontal layers, one or more loudspeakers belong to more than of the horizontal layers, respectively. All the other modifications described above and mentioned in the subsequent claims are feasible as well, such as the usage of spectral shaping 58 so as to derive the second partial loudspeaker signals 34 from the at least one audio signal 18 in order to result into the second position being a virtual position 102 above the highest one or below the lowest one of the horizontal layers.

Although some aspects have been described in the context of an apparatus, it is clear that these aspects also represent a description of the corresponding method, where a device or a part thereof corresponds to a method step or a feature of a method step. Analogously, aspects described in the context of a method step also represent a description of a corresponding apparatus or part of an apparatus or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any parts of the methods described herein, may be performed at least partially by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] A. B. S and S. M. R. Apparent sound source translator. February 1966. U.S. Pat. No. 3,236,949.

[2] Philip A Nelson, Hareo Hamada, and Stephen J Elliott. Adaptive inverse filters for stereophonic sound reproduction. IEEE Transactions on Signal Processing, 40(7): 1621-1632, 1992.

[3] P. A. Nelson and J. F. W. Rose. Errors in two-point sound reproduction. The Journal of the Acoustical Society of America, 118(1):193, 2005.

[4] Takashi Takeuchi and Philip A. Nelson. Optimal source distribution for binaural synthesis over loudspeakers. The Journal of the Acoustical Society of America, 112(6): 2786, 2002.

[5] Hironori Tokuno, Ole Kirkeby, Philip A Nelson, and Hareo Hamada. Inverse filter of sound reproduction systems using regularization. IEICE Transactions on Fundamentals of Electronics, Communications and Computer Sciences, 80(5):809-820, 1997.

[6] Ole Kirkeby, Philip A. Nelson, Hareo Hamada, and Felipe Orduna-Bustamante. Fast deconvolution of multichannel systems using regularization. IEEE Transactions on Speech and Audio Processing, 6(2):189-194, 1998.

[7] Edgar Y Choueiri. Optimal crosstalk cancellation for binaural audio with two loud-speakers. Princeton University, page 28, 2008.

[8] B. B. Bauer. Stereophonic earphones and binaural loudspeakers. J. Audio Eng. Soc., 9:148-151, 1961.

[9] J. Huopaniemi. Virtual Acoustics and 3D Sound in Multimedia Signal Processing. PhD thesis, Laboratory of Acoustics and Audio Signal Processing, Helsinki University of Technology, Finland, 1999. Rep. 53.

[10] Hyunkook Lee. Sound source and loudspeaker base angle dependency of phantom image elevation effect. J. Audio Eng. Soc, 65(9):733-748, 2017.

[11] Hyunkook Lee, Dale Johnson, and Maksims Mironovs. Virtual hemispherical amplitude panning (vhap): A method for 3d panning without elevated loudspeakers. In Audio Engineering Society Convention 144, May 2018.

[12] Young Woo Lee et al., "Virtual Height Speaker Rendering for Samsung 10.2-channel Vertical Surround System". In Audio Engineering Society Convention 131, October 2011.

[13] Reinhard Gretzki and Andreas Silzle, "A new method for elevation panning reducing the size of the resulting auditory events", TecniAcustica, Bilbao, 2003.

[14] Christian Borß, "A Polygon-Based Panning Method for 3D Loudspeaker Setups," Audio Engineering Society Convention 137, October, 2014.

[15] MPEG-H Standard, ISO/IEC 23008-3:2015(E).

The invention claimed is:

1. An apparatus for generating loudspeaker signals for a plurality of loudspeakers so that an application of the loudspeaker signals at the plurality of loudspeakers renders at least one audio object at an intended virtual position, the apparatus comprising a computer or an electronic circuit implementing an interface configured to receive an audio input signal which represents the at least one audio object, a first panning gain determiner, configured to determine, depending on the intended virtual position, first panning gains for a first set of loudspeakers of the plurality of loudspeakers, which are arranged within a first horizontal layer, the first panning gains defining a derivation of first partial loudspeaker signals from the at least one audio input signal, which are associated with a rendering of the at least one audio object at a first virtual position upon application of the first partial loudspeaker signals onto the first set of loudspeakers, a vertical panning gain determiner, configured to determine, depending on the intended virtual position, further panning gains for a panning between the first partial loudspeaker signals and one or more second partial loudspeaker signals which is to be applied to a second set of one or more loudspeakers, which is arranged within a second horizontal layer, and is associated with a rendering of the at least one audio object at a second position so as to pan between the first virtual position and the second position, wherein the apparatus is configured to compose the loudspeaker signals from the audio input signal using the first panning gains and the further panning gains, wherein the apparatus is adaptive to different setups of the plurality of loudspeakers and configured to associate the plurality of loudspeakers to a plurality of horizontal layers so that one of the loudspeakers may be associated with different ones of the horizontal layers, and to select the first horizontal layer and the second horizontal layer out of the plurality of horizontal layers depending on the intended virtual position so that, if the intended virtual position is between the horizontal layers, the first horizontal layer and the second horizontal layer are vertically offset to each other with the intended virtual position is being between the first horizontal layer and the second horizontal layer or, if the intended virtual position is vertically offset to all horizontal layers towards above or below the horizontal layers, the first horizontal layer and the second horizontal layer are an outmost layer of the horizontal layers nearest to the intended virtual position, wherein the second set of one or more loudspeakers comprises more than one loudspeaker, the one or more second partial loudspeaker signals comprise more than one second partial loudspeaker signals and the apparatus further comprises a second panning gain determiner, configured to determine, depending on the intended virtual position, second panning gains for the second set of loudspeakers, the second panning gains defining a derivation of the second partial loudspeaker signals from the at least one audio input signal, and wherein the apparatus is configured to compose the loudspeaker signals from the audio input signal using the first and second panning gains and the further panning gains, a) the second panning gain determiner is configured to derive the second partial loudspeaker signals by spectral shaping which mimics properties of a Head Related Transfer Function, HRTF, along a perception direction from the second position so that the second position is a virtual position vertically offset from the second horizontal layer and a vertical projection of the second virtual position onto the second horizontal layer coincides with a listener position, or b) the second panning gain determiner is configured to derive the second partial loudspeaker signals by spectral shaping so that the second position is vertically above the second layer set and a vertical projection of the second virtual position onto the second horizontal layer coincides with a listener position and to perform the spectral shaping so that the second partial loudspeaker signals are, relative to the at least one audio input signal, dampened in a notch spectral range between 200 and 1000 Hz and amplified within one or more in peak spectral ranges between 1000 and 10 KHz, or so that the second position is vertically below the second layer set and a vertical projection of the second virtual position onto the second horizontal layer coincides with a listener position and to perform the spectral shaping so that the second partial loudspeaker signals are, relative to the at least one audio signal, dampened in a spectral range above 1000 Hz, or c) the second panning gain determiner is configured to derive the second partial loudspeaker signals by spectral shaping so that the second position is vertically above the second layer set and a vertical projection of the second virtual position onto the second horizontal layer coincides with a listener position and to perform the spectral shaping so that the second partial loudspeaker signals are, relative to the at least one audio input signal, dampened in a notch spectral range between 200 and 1000 Hz and amplified within one or more in peak spectral ranges between 1000 and 10 kHz, or so that the second position is vertically below the second layer set and a vertical projection of the second virtual position onto the second horizontal layer coincides with a listener position and to perform the spectral shaping so that the second partial loudspeaker signals are, relative to the at least one audio signal, dampened in a spectral range above 1000 Hz with an intermediate reduction of the dampening within a spectral subrange within the spectral range, located between 5 and 10 kHz, and amplified between 500 Hz and 1 kHz, or d) the apparatus is configured to if the intended virtual position is vertically above the second layer set, position the second position to be vertically above the second layer set and so that a vertical projection of the second position onto the second horizontal layer coincides with a listener position, and derive the second partial loudspeaker signals by spectral shaping so that the second partial loudspeaker signals are, relative to the at least one audio signal, dampened in a notch spectral range between 200 and 1000 Hz and amplified within one or more in peak spectral ranges Between 1000 and 10 KHz, and if the intended virtual position is vertically below the second layer set, position the second virtual position to be vertically below the second layer set and so that a vertical projection of the second position onto the second horizontal layer coincides with a listener position, and derive the second panning gains by spectral shaping so that the second partial loudspeaker signals are, relative to the at least one audio signal, dampened in a spectral range above 1000 Hz, or e) the second panning gain determiner is capable of deriving the second partial loudspeaker signals using spectral shaping and the plurality of loudspeakers forms a setup in which the loudspeakers are associated with horizontal layers, and the apparatus is configured to be responsive to a change of the intended virtual position so as to if the intended virtual position is between two horizontal layers, select the first layer set to be a first of the two horizontal layers and the second layer set to be a second of the two horizontal layers, and the first set out of loudspeakers associated with the first horizontal layer and the second set out of loudspeakers associated with the second horizontal layer, wherein the first and second panning gain determiner are configured to determine, depending on the intended virtual position, the first and second panning gains, and the spectral shaping is switched off, so that the first virtual position is within the first horizontal layer and the second virtual position is within the second horizontal layer and the first virtual position and the second position coincide in a vertical projection, and if the intended virtual position is vertically offset to all horizontal layers towards above or below the horizontal layers, select the first layer set and the second layer set to be an outmost layer of the horizontal layers nearest to the intended virtual position, and the first set and the second set out of loudspeakers associated with the outmost layer, wherein the first panning gain determiner is configured to determine, depending on the intended virtual position, the first panning gains and the spectral shaping is used, so that the second position is a virtual position vertically offset relative to the outmost layer towards a direction at which the intended virtual position lies and a vertical projection of the second position onto the second horizontal layer coincides with a listener position, or f) the second panning gain determiner is capable of deriving the second partial loudspeaker signals using spectral shaping and the plurality of loudspeakers forms a setup in which the loudspeakers are associated with one or more horizontal layers, and the apparatus is configured to be responsive to a number of the one or more horizontal layers and a change of the intended virtual position so as to if the number of one or more horizontal layers is larger than one, if the intended virtual position is between two horizontal layers, select the first layer set to be a first of the two horizontal layers and the second layer set to be a second of the two horizontal layers, and the first set out of loudspeakers associated with the first horizontal layer and the second set out of loudspeakers associated with the second horizontal layer, wherein the first and second panning gain determiner are configured to determine, depending on the intended virtual position, the first and second panning gains, and the spectral shaping is switched off, so that the first virtual position is within the first horizontal layer and the second virtual position is within the second horizontal layer and the first virtual position and the second position coincide in a vertical projection, and if the intended virtual position is vertically offset to all horizontal layers towards above or below the horizontal layers, select the first layer set and the second layer set to be an outmost layer of the horizontal layers nearest to the intended virtual position, and the first set and the second set out of loudspeakers associated with the outmost layer, wherein the first panning gain determiner is configured to determine, depending on the intended virtual position, the first panning gains and the spectral shaping is used, so that the second position is a virtual position vertically offset relative to the outmost layer towards a direction at which the intended virtual position lies and a vertical projection of the second position onto the second horizontal layer coincides with a listener position, and if the number of one or more horizontal layers is one, if the intended virtual position is within the one horizontal layer, compose the loudspeaker signals purely from the first partial loudspeaker signals, and if the intended virtual position is vertically offset to the one horizontal layer, select the first layer set and the second layer set to be the one horizontal layer, and the first set and the second set out of loudspeakers associated with the one horizontal layer, wherein the first panning gain determiner is configured to determine, depending on the intended virtual position, the first panning gains and the spectral shaping is used, so that the second position is a virtual position vertically offset relative to the one horizontal layer towards a direction at which the intended virtual position lies and a vertical projection of the second position onto the second horizontal layer coincides with a listener position.

2. Apparatus according to claim 1, wherein the second set of loudspeakers are within a second layer set of one or more horizontal layers and the first and second layer sets are vertically offset to each other.

3. Apparatus according to claim 1, wherein the second set of loudspeakers are within a second layer set of one or more horizontal layers and the first and second layer sets are vertically offset to each other with the intended virtual position being vertically therebetween.

4. Apparatus according to claim 1, wherein the second set of loudspeakers are within a second layer set of one or more horizontal layers and the first and second panning gain determiners are configured to select the first and second sets of loudspeakers of the plurality of loudspeakers so that the first and second layer sets are, among horizontal layers which the plurality of loudspeakers are distributed onto, vertically nearest to the intended virtual position and vertically offset to each other with the intended virtual position being vertically therebetween.

5. Apparatus according to claim 1, wherein the apparatus is configured to be responsive to a change of the intended virtual position so as to if the intended virtual position is between two horizontal layers, the first and second panning gain determiner are configured to determine, depending on the intended virtual position, the first and second panning gains so that the first virtual position and the second position coincide in a vertical projection, and the spectral shaping is switched off, and/or if the intended virtual position is vertically offset to all horizontal layers towards above or below the horizontal layers, the first panning gain determiner is configured to determine, depending on the intended virtual position, the first panning gains so that the first virtual position coincides in a vertical projection, with the intended virtual position.

6. Apparatus according to claim 1, wherein the apparatus is configured to be responsive to a number of the one or more horizontal layers and a change of the intended virtual position so as to if the number of one or more horizontal layers is larger than one, if the intended virtual position is between two horizontal layers, the first and second panning gain determiner are configured to determine, depending on the intended virtual position, the first and second panning gains so that the first virtual position and the second position coincide in a vertical projection, and/or if the intended virtual position is vertically offset to all horizontal layers towards above or below the horizontal layers, the first panning gain determiner is configured to determine, depending on the intended virtual position, the first panning gains so that the first virtual position coincides in a vertical projection, with the intended virtual position, and/or if the number of one or more horizontal layers is one, if the intended virtual position is vertically offset to the one horizontal layer, the first panning gain determiner is configured to determine, depending on the intended virtual position, the first panning gains so that the first virtual position coincides in a vertical projection, with the intended virtual position.

7. Apparatus according to claim 1, wherein the first set of loudspeakers is comprised in the second set of one or more loudspeakers, and/or wherein the second set of one or more loudspeakers is comprised in the first set of loudspeakers, and/or wherein the first set of loudspeakers and the second set of one or more loudspeakers coincide, and/or wherein the first set of loudspeakers and the second set of one or more loudspeakers partially overlap, and/or wherein the first set of loudspeakers and the second set of one or more loudspeakers are disjoint sets.

8. Apparatus according to claim 1, configured to select the first set of loudspeakers out of the plurality of loudspeakers depending on a horizontal component of the intended virtual position or depending on the horizontal component of the intended virtual position and a vertical component of the intended virtual position, and/or configured to select the second set of one or more loudspeakers out of the plurality of loudspeakers depending on a vertical component of the intended virtual position or depending on the horizontal component of the intended virtual position and the vertical component of the intended virtual position.

9. Apparatus according to claim 1, wherein the second set of one or more loudspeakers comprises one or more loudspeakers at, or horizontally surrounding, the second position, and horizontally arranged between the first set of loudspeakers.

10. Apparatus according to claim 1,
wherein the first and/or second panning gain determiners are configured to determine the first and/or second panning gains further depending on a listener position.

11. Apparatus according to claim 1,
wherein the plurality of loudspeakers refer to any one of, or a combination of, one or more loudspeaker arrays, one or more soundbars, one or more smart speakers, one or more stereo speakers, one or more surround sound setups, or one or more sets of individual loudspeakers.

12. Apparatus according to claim 1,
wherein the audio input signal is one of a channel-based audio signal, object-based audio signal, and/or scene-based audio signal.

13. Apparatus according to claim 1,
configured to derive the intended virtual position from the audio input signal.

14. Apparatus according to claim 1,
wherein the panning gains are amplitude panning gains.

15. Apparatus according to claim 1,
wherein the audio input signal is a channel-based audio signal defining an audio signal for each of signal-specific loudspeaker positions,
wherein the apparatus is configured to treat each of a selection of one or more (or all) out of the audio signals for the signal-specific loudspeaker positions as one of the at least one audio object.

16. Apparatus according to claim 15, configured to
derive the intended virtual position of the one audio object from the loudspeaker position of the respective audio signal.

17. Apparatus according to claim 16, configured to
wherein the intended virtual position of the one audio object is derived from the loudspeaker position of the respective audio signal in a manner so that a mutual positional relationship between the signal-specific loudspeaker position is maintained.

18. Apparatus according to claim 1,
wherein the audio input signal is an object-based audio signal defining one or more renderable audio objects,
wherein the apparatus is configured to use a selection of one or more (or all) out of the one or more renderable audio objects as one of the at least one audio object.

19. Apparatus according to claim 1,
configured to receive information on a change of the plurality of loudspeakers in terms of loudspeaker position and to take the change into account in subsequent generation of the loudspeaker signals and/or
configured to receive information on a change of the plurality of loudspeakers in terms of number of loudspeakers and to take the change into account in subsequent generation of the loudspeaker signals.

20. An apparatus for generating loudspeaker signals for a plurality of loudspeakers so that an application of the loudspeaker signals at the plurality of loudspeakers renders at least one audio object at an intended virtual position, wherein the plurality of loudspeakers are distributed onto one or more horizontal layers, the apparatus comprising a computer or an electronic circuit implementing
an interface configured to receive an audio input signal which represents the at least one audio object,
a first loudspeaker signal set determiner, configured to determine, depending on the intended virtual position, first panning gains for a first set of loudspeakers of the plurality of loudspeakers, and use the first panning gains to derive first partial loudspeaker signals from the at least one audio input signal, which are associated with a rendering of the at least one audio object at a first virtual position upon application of the first partial loudspeaker signals onto the first set of loudspeakers,
a second loudspeaker signal set determiner, configured to, by spectral shaping and by panning gains, derive second partial loudspeaker signals from the at least one audio input signal, the second partial loudspeaker signals being associated with a rendering of the at least one audio object at a second virtual position upon application of the second partial loudspeaker signals onto a second set of loudspeakers of the plurality of loudspeakers, wherein the panning gains are selected so that the second virtual position is above or below the one or more horizontal layers and corresponds to a horizontal position which coincides with a listener position along a vertical projection, and
a vertical panning gain determiner configured to, depending on the intended virtual position, determine further panning gains for the first and second partial loudspeaker signals so as to pan between the first and second virtual positions, and
a composer configured to compose the loudspeaker signals from the first and second partial loudspeaker signals using the further panning gains,
a) wherein the second loudspeaker signal set determiner is configured so that the second virtual position is vertically above the one or more horizontal layers and to perform the spectral shaping so that the second partial loudspeaker signals are, relative to the at least one audio signal, dampened in a notch spectral range between 200 and 1000 Hz and amplified within one or more in peak spectral ranges between 1000 and 10 kHz, or
wherein the second loudspeaker signal set determiner is configured so that the second virtual position is vertically below the one or more horizontal layers and to perform the spectral shaping so that the second partial loudspeaker signals are, relative to the at least one audio signal, dampened in a spectral range above 1000 Hz, or
b) wherein the second loudspeaker signal set determiner is configured so that the second virtual position is vertically above the one or more horizontal layers and to perform the spectral shaping so that the second partial loudspeaker signals are, relative to the at least one audio signal, dampened in a notch spectral range between 200 and 1000 Hz and amplified within one or more in peak spectral ranges between 1000 and 10 kHz, or
wherein the second loudspeaker signal set determiner is configured so that the second virtual position is vertically below the one or more horizontal layers and to perform the spectral shaping so that the second partial loudspeaker signals are, relative to the at least one audio signal, dampened in a spectral range above 1000 Hz with an intermediate reduction of the dampening within a spectral subrange within the spectral range, located between 5 and 10 kHz, and amplified between 500 Hz and 1 kHz or c) wherein the second loudspeaker signal set determiner is configured to, if the intended virtual position is vertically above the one or more horizontal layers, position the second virtual position to be vertically above the one or more horizontal layers, perform the spectral shaping so that the second partial loudspeaker signals are, relative to the at least one audio signal, dampened in a notch spectral range between 200 and 1000 Hz and amplified within one or more in peak spectral ranges Between 1000 and 10 kHz, and if the intended virtual position is vertically below the one or more horizontal layers, position the second virtual position to be vertically below the one or more horizontal layers, perform the spectral shaping so that the second partial loudspeaker signals are, relative to the at least one audio signal, dampened in a spectral range above 1000 Hz, or d) wherein the composer is configured to be responsive to a change of the intended virtual position from an in-layer position, which is vertically within or in-between the one or more layers, to a position vertically offset from the one or more horizontal layers, by controlling the further panning gains so as to fade from composing the loudspeaker signals purely from the first partial loudspeaker signals to composing the loudspeaker signals from the first and second partial loudspeaker signals so that the further panning gains pan from the first virtual position towards the second virtual position.

21. Apparatus according to claim 20, wherein the first set of loudspeakers is within one or more horizontal layers which is/are, among the one or more horizontal layers, vertically nearest to the intended virtual position.

22. Apparatus according to claim 20, wherein the first loudspeaker signal set determiner is configured to select the first set of loudspeakers of the plurality of loudspeakers so that the first set of loudspeakers is within one or more horizontal layers which is/are, among the one or more horizontal layers, vertically nearest to the intended virtual position.

23. Apparatus according to claim 20, wherein the first loudspeaker signal set determiner is configured so that the first set of loudspeakers is within one horizontal layer and to determine the first panning gains further depending on positions of the first set of loudspeakers within the one horizontal layer.

24. Apparatus according to claim 20, wherein the first loudspeaker signal set determiner is configured so that the first panning gains implement a pure amplitude panning so that the first virtual position is between positions of the set of first loudspeakers.

25. Apparatus according to claim 20, wherein the first loudspeaker signal set determiner is configured to determine the first panning gains further depending on a listener position.

26. Apparatus according to claim 20, wherein the second loudspeaker signal set determiner is configured so that the spectral shaping mimics properties of a Head Related Transfer Function, HRTF, along a perception direction from the second virtual position.

27. Apparatus according to claim 20, wherein the second loudspeaker signal set determiner is configured to derive the second partial loudspeaker signals from the at least one audio signal so that the second partial loudspeaker signals are generated from the at least one audio signal using an amplitude gain factor which is equal for all of the second partial loudspeaker signals, or by panning using panning gains which correspond to a horizontal central position or sweet spot position in-between the second set of loudspeakers.

28. Apparatus according to claim 20, wherein the first set of loudspeakers is comprised in the second set of loudspeakers, and/or wherein the second set of loudspeakers is comprised in the first set of loudspeakers, and/or wherein the first set of loudspeakers and the second set of loudspeakers coincide, and/or wherein the first set of loudspeakers and the second set of loudspeakers partially overlap, and/or wherein the first set of loudspeakers and the second set of loudspeakers are mutually exclusive.

29. Apparatus according to claim 20, configured to select the first set of loudspeakers out of the plurality of loudspeakers depending on a horizontal component of the intended virtual position or depending on the horizontal component of the intended virtual position and a vertical component of the intended virtual position, and/or configured to select the second set of loudspeakers out of the plurality of loudspeakers depending on a vertical component of the intended virtual position or depending on the horizontal component of the intended virtual position and the vertical component of the intended virtual position.

30. A system comprising:

a plurality of loudspeakers;

a first apparatus for generating loudspeaker signals for the plurality of loudspeakers so that an application of the loudspeaker signals at the plurality of loudspeakers renders at least one audio object at an intended virtual position, the first apparatus comprising a computer or a electronic circuit implementing a first apparatus interface configured to receive an audio input signal which represents the at least one audio object, a first panning gain determiner, configured to determine, depending on the intended virtual position, first panning gains for a first set of loudspeakers of the plurality of loudspeakers, which are arranged within a first horizontal layer, the first panning gains defining a derivation of first partial loudspeaker signals from the audio input signal, which are associated with a rendering of the at least one audio object at a first virtual position upon application of the first partial loudspeaker signals onto the first set of loudspeakers, a first apparatus vertical panning gain determiner, configured to determine, depending on the intended virtual position, further panning gains for a panning between the first partial loudspeaker signals and one or more second partial loudspeaker signals which is to be applied to a second set of loudspeakers of the plurality of loudspeakers, which is arranged within a second horizontal layer, which is vertically offset relative to the first layer set, and is associated with a rendering of the at least one audio object at a second virtual position so as to pan between the first virtual position and the second virtual position, wherein the first apparatus is configured to compose the loudspeaker signals from the audio input signal using the first panning gains and the further panning gains, wherein the first apparatus is adaptive to different setups of the plurality of loudspeakers and configured to associate the plurality of loudspeakers to a plurality of horizontal layers so that one of the loudspeakers may be associated with different ones of the horizontal layers, and to select the first horizontal layer and the second horizontal layer out of the plurality of horizontal layers so that the intended virtual position is between the first horizontal layer and the second horizontal layer; and a second apparatus for generating loudspeaker signals for the plurality of loudspeakers so that an application of the loudspeaker signals at the plurality of loudspeakers renders the at least one audio object at the intended virtual position, wherein the plurality of loudspeakers are distributed onto one or more horizontal layers, the second apparatus comprising a second computer or a second electronic circuit implementing a second apparatus interface configured to receive the audio input signal which represents the at least one audio object, a first loudspeaker signal set determiner, configured to determine, depending on the intended virtual position, first panning gains for the first set of loudspeakers of the plurality of loudspeakers, and use the first panning gains to derive the first partial loudspeaker signals from the audio input signal, which are associated with the rendering of the at least one audio object at the first virtual position upon application of the first partial loudspeaker signals onto the first set of loudspeakers, a second loudspeaker signal set determiner, configured to, by spectral shaping and by panning gains, derive second partial loudspeaker signals from the audio input signal, the second partial loudspeaker signals being associated with the rendering of the at least one audio object at the second virtual position upon application of the second partial loudspeaker signals onto the second set of loudspeakers of the plurality of loudspeakers, wherein the panning gains are selected so that the second virtual position is above or below the one or more horizontal layers and corresponds to a horizontal position which coincides with a listener position along a vertical projection, and a second apparatus vertical panning gain determiner configured to, depending on the intended virtual position, determine further panning gains for the first and second partial loudspeaker signals so as to pan between the first and second virtual positions, and a composer configured to compose the loudspeaker signals from the first and second partial loudspeaker signals using the further panning gains.

31. Method for generating loudspeaker signals for a plurality of loudspeakers so that an application of the loudspeaker signals at the plurality of loudspeakers renders at least one audio object at an intended virtual position, the method comprising receiving an audio input signal which represents the at least one audio object, determining, depending on the intended virtual position, first panning gains for a first set of loudspeakers of the plurality of loudspeakers, which are arranged within a first layer set of one or more first horizontal layers, the first panning gains defining a derivation of first partial loudspeaker signals from the at least one audio input signal, which are associated with a rendering of the at least one audio object at a first virtual position upon application of the first partial loudspeaker signals onto the first set of loudspeakers, determining, depending on the intended virtual position, further panning gains for a panning between the first partial loudspeaker signals and one or more second partial loudspeaker signals which is to be applied to a second set of one or more loudspeakers, and is associated with a rendering of the at least one audio object at a second position so as to pan between the first virtual position and the second position, composing the loudspeaker signals from the audio input signal using the first panning gains and the further panning gains, and adapting to different setups of the plurality of loudspeakers by associating the plurality of loudspeakers to a plurality of horizontal layers so that one of the loudspeakers may be associated with different ones of the horizontal layers, and selecting the first horizontal layer and the second horizontal layer out of the plurality of horizontal layers depending on the intended virtual position so that, if the intended virtual position is between the horizontal layers, the first horizontal layer and the second horizontal layer are vertically offset to each other with the intended virtual position being between the first horizontal layer and the second horizontal layer or, if the intended virtual position is vertically offset to all horizontal layers towards above or below the horizontal layers, the first horizontal layer and the second horizontal layer are an outmost layer of the horizontal layers nearest to the intended virtual position, wherein the second set of one or more loudspeakers comprises more than one loudspeaker, the one or more second partial loudspeaker signals comprise more than one second partial loudspeaker signals and the method further comprises determining, depending on the intended virtual position, second panning gains for the second set of loudspeakers, the second panning gains defining a derivation of the second partial loudspeaker signals from the at least one audio input signal, and wherein the loudspeaker signals are composed from the audio input signal using the first and second panning gains and the further panning gains, wherein a) the second partial loudspeaker signals are derived by spectral shaping which mimics properties of a Head Related Transfer Function, HRTF, along a perception direction from the second position so that the second position is a virtual position vertically offset from the second horizontal layer and a vertical projection of the second virtual position onto the second horizontal layer coincides with a listener position, or b) the second partial loudspeaker signals are derived by spectral shaping so that the second position is vertically above the second layer set and a vertical projection of the second position onto the second horizontal layer coincides with a listener position and to perform the spectral shaping so that the second partial loudspeaker signals are, relative to the at least one audio input signal, dampened in a notch spectral range between 200 and 1000 Hz and amplified within one or more in peak spectral ranges between 1000 and 10 kHz, or so that the second position is vertically below the second layer set and a vertical projection of the second virtual position onto the second horizontal layer coincides with a listener position and to perform the spectral shaping so that the second partial loudspeaker signals are, relative to the at least one audio signal, dampened in a spectral range above 1000 Hz, or c) the second partial loudspeaker signals are derived by spectral shaping so that the second position is vertically above the second layer set and a vertical projection of the second position onto the second horizontal layer coincides with a listener position and to perform the spectral shaping so that the second partial loudspeaker signals are, relative to the at least one audio input signal, dampened in a notch spectral range between 200 and 1000 Hz and amplified within one or more in peak spectral ranges between 1000 and 10 kHz, or so that the second position is vertically below the second layer set and a vertical projection of the second position onto the second horizontal layer coincides with a listener position and to perform the spectral shaping so that the second partial loudspeaker signals are, relative to the at least one audio signal, dampened in a spectral range above 1000 Hz with an intermediate reduction of the dampening within a spectral subrange within the spectral range, located between 5 and 10 KHz, and amplified between 500 Hz and 1 kHz, or d) the method comprises if the intended virtual position is vertically above the second layer set, positioning the second position to be vertically above the second layer set and so that a vertical projection of the second position onto the second horizontal layer coincides with a listener position, and deriving the second partial loudspeaker signals by, spectral shaping so that the second partial loudspeaker signals are, relative to the at least one audio signal, dampened in a notch spectral range between 200 and 1000 Hz and amplified within one or more in peak spectral ranges Between 1000 and 10 kHz, and if the intended virtual position is vertically below the second layer set, positioning the second virtual position to be vertically below the second layer set and so that a vertical projection of the second position onto the second horizontal layer coincides with a listener position, and deriving the second partial loudspeaker signals by spectral shaping so that the second partial loudspeaker signals are, relative to the at least one audio signal, dampened in a spectral range above 1000 Hz, or e) the second partial loudspeaker signals are derived involving spectral shaping as an option and the plurality of loudspeakers forms a setup in which the loudspeakers are associated with horizontal layers, and the apparatus is configured to be responsive to a change of the intended virtual position so as to if the intended virtual position is between two horizontal layers, select the first layer set to be a first of the two horizontal layers and the second layer set to be a second of the two horizontal layers, and the first set out of loudspeakers associated with the first horizontal layer and the second set out of loudspeakers associated with the second horizontal layer, wherein the spectral shaping is switched off, so that the first virtual position is within the first horizontal layer and the second virtual position is within the second horizontal layer and the first virtual position and the second position coincide in a vertical projection, and if the intended virtual position is vertically offset to all horizontal layers towards above or below the horizontal layers, select the first layer set and the second layer set to be an outmost layer of the horizontal layers nearest to the intended virtual position, and the first set and the second set out of loudspeakers associated with the outmost layer, wherein the spectral shaping is used, so that the second position is a virtual position vertically offset relative to the outmost layer towards a direction at which the intended virtual position lies and a vertical projection of the second position onto the second horizontal layer coincides with a listener position, or f) the second partial loudspeaker signals are derived involving spectral shaping as an option and the plurality of loudspeakers forms a setup in which the loudspeakers are associated with one or more horizontal layers, and the apparatus is configured to be responsive to a number of the one or more horizontal layers and a change of the intended virtual position so as to if the number of one or more horizontal layers is larger than one, if the intended virtual position is between two horizontal layers, select the first layer set to be a first of the two horizontal layers and the second layer set to be a second of the two horizontal layers, and the first set out of loudspeakers associated with the first horizontal layer and the second set out of loudspeakers associated with the second horizontal layer, wherein the spectral shaping is switched off, so that the first virtual position is within the first horizontal layer and the second virtual position is within the second horizontal layer and the first virtual position and the second position coincide in a vertical projection, and if the intended virtual position is vertically offset to all horizontal layers towards above or below the horizontal layers, select the first layer set and the second layer set to be an outmost layer of the horizontal layers nearest to the intended virtual position, and the first set and the second set out of loudspeakers associated with the outmost layer, wherein the spectral shaping is used, so that the second position is a virtual position vertically offset relative to the outmost layer towards a direction at which the intended virtual position lies and a vertical projection of the second position onto the second horizontal layer coincides with a listener position, and if the number of one or more horizontal layers is one, if the intended virtual position is within the one horizontal layer, the loudspeaker signals are composed purely from the first partial loudspeaker signals, and if the intended virtual position is vertically offset to the one horizontal layer, the first layer set and the second layer set are selected to be the one horizontal layer, and the first set and the second set out of loudspeakers associated with the one horizontal layer, wherein the spectral shaping is used, so that the second position is a virtual position vertically offset relative to the one horizontal layer towards a direction at which the intended virtual position lies and a vertical projection of the second position onto the second horizontal layer coincides with a listener position.

32. Method for generating loudspeaker signals for a plurality of loudspeakers so that an application of the loudspeaker signals at the plurality of loudspeakers renders at least one audio object at an intended virtual position, wherein the plurality of loudspeakers are distributed onto one or more horizontal layers, the method comprising receiving an audio input signal which represents the at least one audio object, determining, depending on the intended virtual position, first panning gains for a first set of loudspeakers of the plurality of loudspeakers, and use the first panning gains to derive first partial loudspeaker signals from the at least one audio input signal, which are associated with a rendering of the at least one audio object at a first virtual position upon application of the first partial loudspeaker signals onto the first set of loudspeakers, by spectral shaping, deriving second partial loudspeaker signals from the at least one audio input signal, the second partial loudspeaker signals being associated with a rendering of the at least one audio object at a second virtual position upon application of the second partial loudspeaker signals onto a second set of loudspeakers, the second virtual position being above or below the one or more horizontal layers, and depending on the intended virtual position, determining further panning gains for the first and second partial loudspeaker signals so as to pan between the first and second virtual positions, and composing the loudspeaker signals from the first and second partial loudspeaker signals using the further panning gains, a) wherein the second virtual position is vertically above the one or more horizontal layers and the spectral shaping is performed so that the second partial loudspeaker signals are, relative to the at least one audio signal, dampened in a notch spectral range between 200 and 1000 Hz and amplified within one or more in peak spectral ranges between 1000 and 10 KHz, or wherein the second virtual position is vertically below the one or more horizontal layers and to perform the spectral shaping so that the second partial loudspeaker signals are, relative to the at least one audio signal, dampened in a spectral range above 1000 Hz, or b) wherein the second virtual position is vertically above the one or more horizontal layers and the spectral shaping is performed so that the second partial loudspeaker signals are, relative to the at least one audio signal, dampened in a notch spectral range between 200 and 1000 Hz and amplified within one or more in peak spectral ranges between 1000 and 10 kHz, or wherein the second virtual position is vertically below the one or more horizontal layers and the spectral shaping is performed so that the second partial loudspeaker signals are, relative to the at least one audio signal, dampened in a spectral range above 1000 Hz with an intermediate reduction of the dampening within a spectral subrange within the spectral range, located between 5 and 10 kHz, and amplified between 500 Hz and 1 kHz or c) wherein if the intended virtual position is vertically above the one or more horizontal layers, the second virtual position is positioned to be vertically above the one or more horizontal layers, and the spectral shaping is performed so that the second partial loudspeaker signals are, relative to the at least one audio signal, dampened in a notch spectral range between 200 and 1000 Hz and amplified within one or more in peak spectral ranges between 1000 and 10 kHz, and if the intended virtual position is vertically below the one or more horizontal layers, the second virtual position is positioned to be vertically below the one or more horizontal layers, the spectral shaping is performed so that the second partial loudspeaker signals are, relative to the at least one audio signal, dampened in a spectral range above 1000 Hz, or d) wherein, responsive to a change of the intended virtual position from an in-layer position, which is vertically within or in-between the one or more layers, to a position vertically offset from the one or more horizontal layers, the further panning gains are controlled so as to fade from composing the loudspeaker signals purely from the first partial loudspeaker signals to composing the loudspeaker signals from the first and second partial loudspeaker signals so that the further panning gains pan from the first virtual position towards the second virtual position.

33. A non-transitory digital storage medium having a computer program stored thereon to perform the method for generating loudspeaker signals for a plurality of loudspeakers so that an application of the loudspeaker signals at the plurality of loudspeakers renders at least one audio object at an intended virtual position, the method of claim 31, when said computer program is run by a computer.

34. A non-transitory digital storage medium having a computer program stored thereon to perform the method for generating loudspeaker signals for a plurality of loudspeakers so that an application of the loudspeaker signals at the plurality of loudspeakers renders at least one audio object at an intended virtual position, wherein the plurality of loudspeakers are distributed onto one or more horizontal layers, the method of claim 32, when said computer program is run by a computer.

* * * * *